US012563198B2

(12) United States Patent
Huang et al.

(10) Patent No.: US 12,563,198 B2
(45) Date of Patent: Feb. 24, 2026

(54) REGRESSION-BASED DECODER SIDE AFFINE MOTION DERIVATION FOR VIDEO CODING

(71) Applicant: QUALCOMM Incorporated, San Diego, CA (US)

(72) Inventors: Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 18/471,131

(22) Filed: Sep. 20, 2023

(65) Prior Publication Data

US 2024/0129481 A1     Apr. 18, 2024

Related U.S. Application Data

(60) Provisional application No. 63/379,033, filed on Oct. 11, 2022.

(51) Int. Cl.
| | |
|---|---|
| *H04N 19/00* | (2014.01) |
| *H04N 19/139* | (2014.01) |
| *H04N 19/176* | (2014.01) |

(52) U.S. Cl.
CPC ......... *H04N 19/139* (2014.11); *H04N 19/176* (2014.11)

(58) Field of Classification Search
CPC ...................................................... H04N 19/00
See application file for complete search history.

(56) References Cited

U.S. PATENT DOCUMENTS

| | | | |
|---|---|---|---|
| 2021/0227214 A1 | 7/2021 | Liu et al. | |
| 2022/0191502 A1* | 6/2022 | Chen ................... | H04N 19/105 |
| 2023/0328276 A1 | 10/2023 | Zhang et al. | |

OTHER PUBLICATIONS (Alibaba Group) Chen J., et al., "Non-EE2: DMVR for Affine Merge Coded Blocks", JVET-AA0144-v2, Joint Video Experts Team (JVET) of ITU-T SG 16 WP 3 and ISO/IEC JTC 1/SC 29, 27th Meeting, by teleconference, Jul. 13-22, 2022, Teleconference, The Joint Video Exploration Team of ISO/IEC JTC1/SC29/WG11 and ITU-T SG.16 ), m60120, Jul. 18, 2022, XP030303030, Sections 1 and 2, Abstract, pp. 1-5.

(Continued)

*Primary Examiner* — Maryam A Nasri
(74) *Attorney, Agent, or Firm* — QUALCOMM Incorporated

(57) ABSTRACT

A video coder may be configured to partition a coding block into subblocks, and generate initial subblock motion vectors for a plurality of the subblocks. The video coder may further refine the initial subblock motion vectors for the plurality of the subblocks using decoder side motion vector refinement to produce refined subblock motion vectors for the plurality of the subblocks, and perform a linear regression on the refined subblock motion vectors and coordinates of the plurality of the subblocks to derive an affine motion model. The video coder may then code the coding block using the derived affine motion model.

26 Claims, 10 Drawing Sheets

(56)         References Cited

OTHER PUBLICATIONS

Chen J., et al., "EE2-2.6: DMVR for Affine Merge Coded Blocks", Joint Video Experts Team (JVET) of ITU-T SG 16 WP 3 and ISO/IEC JTC 1/SC 29, JVET-AB0112-v1, 28th Meeting, Mainz, DE, Oct. 20-28, 2022, pp. 1-3.

Chen J., et al., "EE2-2.6-related: on Decoder-side Affine Model Refinement (DAMR)", Joint Video Experts Team (JVET) of ITU-T SG 16 WP 3 and ISO/IEC JTC 1/SC 29, JVET-AB0145-v2, 28th Meeting, Mainz, DE, Oct. 20-28, 2022, pp. 1-4.

Coban M., et al., "Algorithm Description of Enhanced Compression Model 7 (ECM 7)", JVET-AB2025, Joint Video Experts Team (JVET) of ITU-T SG 16 WP 3 and ISO/IEC JTC 1/SC 29, 28th Meeting, Mainz, DE, Oct. 20-28, 2022, pp. 1-63.

Co-pending U.S. Appl. No. 18/351,342, inventor Huang; Han, filed Jul. 12, 2023.

Co-pending U.S. Appl. No. 18/467,513, inventor Huang; Han, filed Sep. 14, 2023.

Ghaznavi-Youvalari R., et al., "Regression-Based Motion Vector Field for Video Coding", IEEE Transactions on Circuits and Systems for Video Technology, IEEE, USA, vol. 31, No. 5, Sep. 18, 2019, XP011852711, Retrieved: May 4, 2021, pp. 2034-2038, Abstract section II figure 1.

Ghaznavi-Youvalari R et al., "CE4-related: Merge Mode with Regression Based Motion Vector Field (RMVF)", JVET-L0171, 12 Meeting, , Macao, CN, Oct. 3, 2018-Oct. 12, 2018, The Joint Video Exploration Team of ISO/IEC JTC1/ SC29/WG11 and ITU-T SG. 16, No. JVET-L0171, Oct. 6, 2018, pp. 1-4, XP030195051, Section 2.

Huang H., et al., "EE2 Test 2.1, 2.2, 2.3, 2.4: Affine DMVR", Joint Video Experts Team (JVET) of ITU-T SG 16 WP 3 and ISO/IEC JTC 1/SC 29, JVET-AC0144-v3, 29th Meeting, by Teleconference, Jan. 11-20, 2023, pp. 1-5.

Huang H., et al., "EE2-related: Control-point Motion Vector Refinement for Affine DMVR", Joint Video Experts Team (JVET) of ITU-T SG 16 WP 3 and ISO/IEC JTC 1/SC 29, JVET-AB0178-v1, 28th Meeting, Mainz, DE, Oct. 20-28, 2022, pp. 1-3.

Huang (Qualcomm) H., et al., "EE2-related: Sub-block Processing for Affine DMVR", JVET-AB0177-v2, m60965, The Joint Video Exploration Team of ISO/IEC JTC1/SC29/WG11 and ITU-T SG. 16, Joint Video Experts Team (JVET) of ITU-T SG 16 WP 3 and ISO/IEC JTC 1/SC 29, 28th Meeting, Mainz, DE, Oct. 20-28, 2022, pp. 1-3, XP030304760, XP030304762, The Whole Document.

International Search Report and Written Opinion—PCT/US2023/074779—ISA/EPO—Dec. 19, 2023.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AB2024-v3, 28th Meeting: Mainz, DE, Oct. 20-28, 2022, pp. 1-20.

Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

* cited by examiner

100

PREDICT CURRENT BLOCK ⟋350

CALCULATE RESIDUAL BLOCK FOR CURRENT BLOCK ⟋352

TRANSFORM AND QUANTIZE RESIDUAL BLOCK ⟋354

SCAN TRANSFORM COEFFICIENTS OF RESIDUAL BLOCK ⟋356

ENTROPY ENCODE TRANSFORM COEFFICIENTS ⟋358

OUTPUT ENTROPY ENCODED DATA OF BLOCK ⟋360

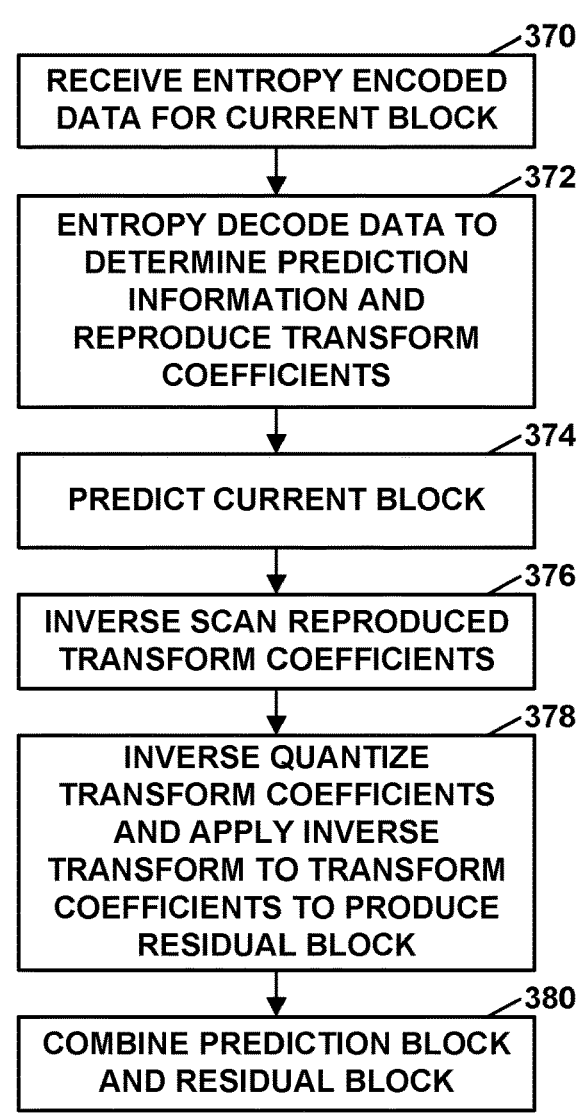

370

RECEIVE ENTROPY ENCODED
DATA FOR CURRENT BLOCK

372

ENTROPY DECODE DATA TO
DETERMINE PREDICTION
INFORMATION AND
REPRODUCE TRANSFORM
COEFFICIENTS

374

PREDICT CURRENT BLOCK

376

INVERSE SCAN REPRODUCED
TRANSFORM COEFFICIENTS

378

INVERSE QUANTIZE
TRANSFORM COEFFICIENTS
AND APPLY INVERSE
TRANSFORM TO TRANSFORM
COEFFICIENTS TO PRODUCE
RESIDUAL BLOCK

380

COMBINE PREDICTION BLOCK
AND RESIDUAL BLOCK

FIG. 8

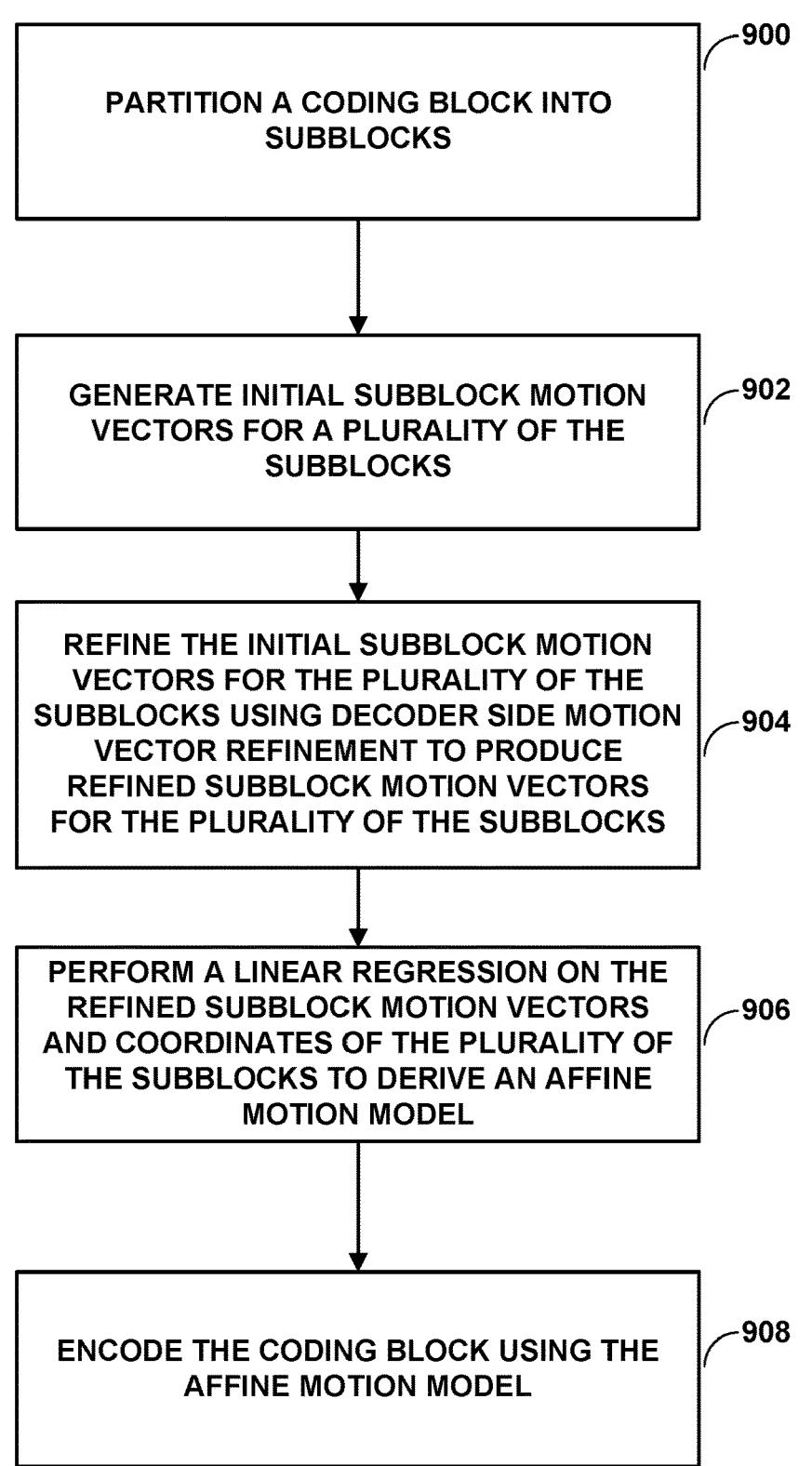

PARTITION A CODING BLOCK INTO
SUBBLOCKS

900

GENERATE INITIAL SUBBLOCK MOTION
VECTORS FOR A PLURALITY OF THE
SUBBLOCKS

902

REFINE THE INITIAL SUBBLOCK MOTION
VECTORS FOR THE PLURALITY OF THE
SUBBLOCKS USING DECODER SIDE MOTION
VECTOR REFINEMENT TO PRODUCE
REFINED SUBBLOCK MOTION VECTORS
FOR THE PLURALITY OF THE SUBBLOCKS

904

PERFORM A LINEAR REGRESSION ON THE
REFINED SUBBLOCK MOTION VECTORS
AND COORDINATES OF THE PLURALITY OF
THE SUBBLOCKS TO DERIVE AN AFFINE
MOTION MODEL

906

ENCODE THE CODING BLOCK USING THE
AFFINE MOTION MODEL

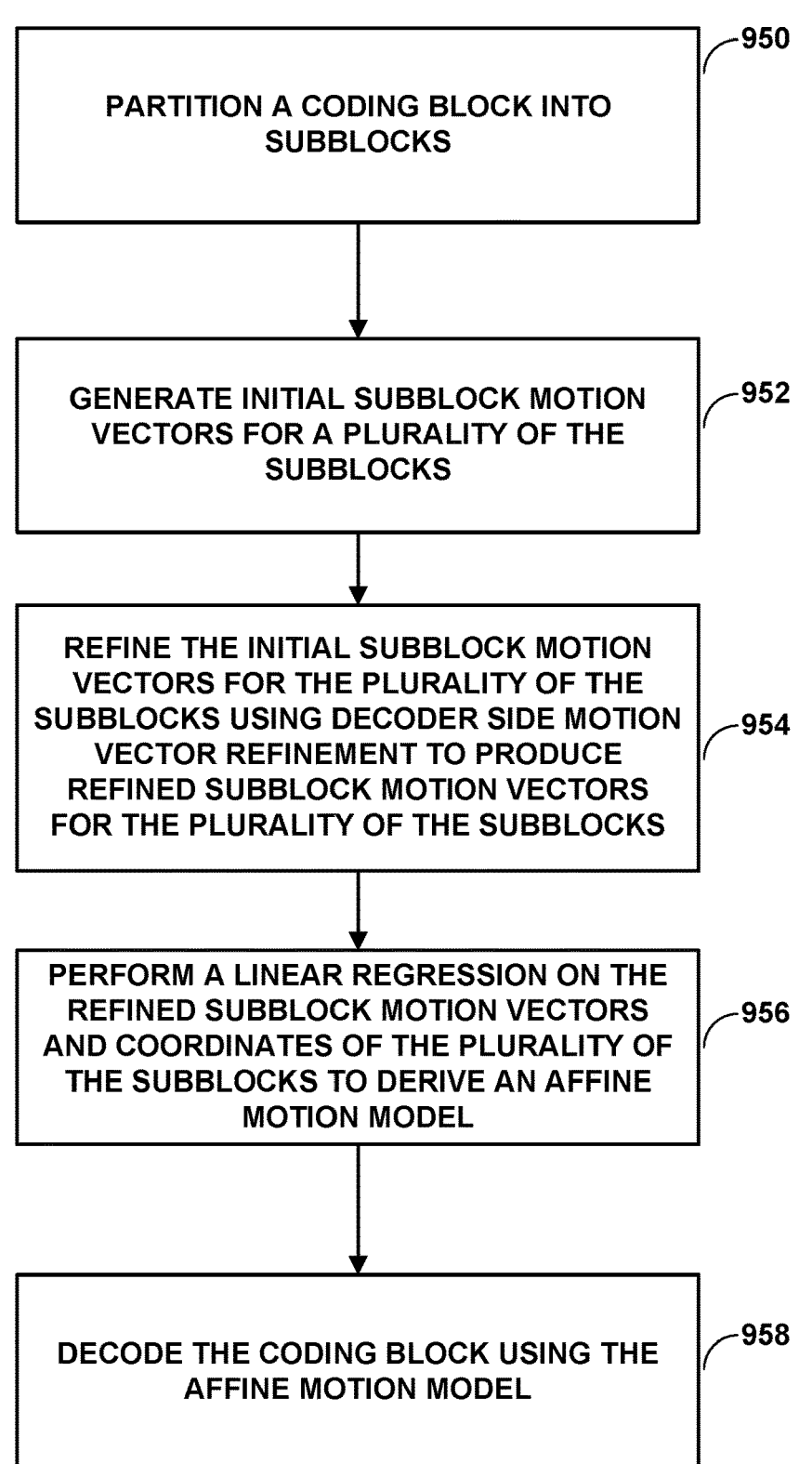

PARTITION A CODING BLOCK INTO SUBBLOCKS — 950

GENERATE INITIAL SUBBLOCK MOTION VECTORS FOR A PLURALITY OF THE SUBBLOCKS — 952

REFINE THE INITIAL SUBBLOCK MOTION VECTORS FOR THE PLURALITY OF THE SUBBLOCKS USING DECODER SIDE MOTION VECTOR REFINEMENT TO PRODUCE REFINED SUBBLOCK MOTION VECTORS FOR THE PLURALITY OF THE SUBBLOCKS — 954

PERFORM A LINEAR REGRESSION ON THE REFINED SUBBLOCK MOTION VECTORS AND COORDINATES OF THE PLURALITY OF THE SUBBLOCKS TO DERIVE AN AFFINE MOTION MODEL — 956

DECODE THE CODING BLOCK USING THE AFFINE MOTION MODEL — 958

FIG. 10

REGRESSION-BASED DECODER SIDE AFFINE MOTION DERIVATION FOR VIDEO CODING

This application claims the benefit of U.S. Provisional Patent Application 63/379,033, filed Oct. 11, 2022, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction in video codecs. More specifically, this disclosure describes methods related to affine motion derivation at the decoder side. The techniques of this disclosure may include dividing a block into a plurality of subblocks and determining initial subblock motion vector for each of the subblocks. The initial subblock motion vectors may be based on an affine merge candidate from a neighboring block and may represent an initial affine motion model.

A video coder may then perform a decoder side motion vector refinement (DMVR) process for each of the subblocks. The DMVR process may include performing bilateral matching for each of the subblocks. The DMVR process results in a refined subblock motion vector for each of the subblocks. For example, the bilateral matching process may return a motion vector offset value to add to the initial motion vector for each of the subblocks. Note that the initial motion vector, and the determined motion vector offset, may be different for each of the subblocks.

A video coder may then perform a linear regression process on the refined subblock motion vectors to derive an updated affine motion model. The video coder may determine control point motion vectors from the updated affine motion model and then code the block using the control point motion vectors. By applying a linear regression process to the refined subblock motion vectors, a more accurate affine motion model may be obtained. As such, coding efficiency may be improved and distortion may be reduced.

In one example, this disclosure describes method including partitioning a coding block into subblocks, generating initial subblock motion vectors for a plurality of the subblocks, refining the initial subblock motion vectors for the plurality of the subblocks using decoder side motion vector refinement to produce refined subblock motion vectors for the plurality of the subblocks, and performing a linear regression on the refined subblock motion vectors and coordinates of the plurality of the subblocks to derive an affine motion model.

In another example, this disclosure describes an apparatus configured to decode video data, the apparatus comprising: a memory, and one or more processors in communication with the memory, the one or more processors configured to partition a coding block into subblocks, generate initial subblock motion vectors for a plurality of the subblocks, refine the initial subblock motion vectors for the plurality of the subblocks using decoder side motion vector refinement to produce refined subblock motion vectors for the plurality of the subblocks, and perform a linear regression on the refined subblock motion vectors and coordinates of the plurality of the subblocks to derive an affine motion model.

In another example, this disclosure describes an apparatus configured to decode video data, the apparatus comprising means for partitioning a coding block into subblocks, means for generating initial subblock motion vectors for a plurality of the subblocks, means for refining the initial subblock motion vectors for the plurality of the subblocks using decoder side motion vector refinement to produce refined subblock motion vectors for the plurality of the subblocks, and means for performing a linear regression on the refined subblock motion vectors and coordinates of the plurality of the subblocks to derive an affine motion model.

In another example, this disclosure describes a non-transitory computer-readable storage medium storing instructions that, when executed, cause one or more processors to partition a coding block into subblocks, generate initial subblock motion vectors for a plurality of the subblocks, refine the initial subblock motion vectors for the plurality of the subblocks using decoder side motion vector refinement to produce refined subblock motion vectors for the plurality of the subblocks, and perform a linear regression on the refined subblock motion vectors and coordinates of the plurality of the subblocks to derive an affine motion model.

The details of one or more examples are set forth in the accompanying drawings and the description below. Other features, objects, and advantages will be apparent from the description, drawings, and claims.

BRIEF DESCRIPTION OF DRAWINGS

FIG. 8 is a flowchart illustrating an example method for decoding a current block in accordance with the techniques of this disclosure.

FIG. 9 is a flowchart illustrating another example method for encoding a current block in accordance with the techniques of this disclosure.

FIG. 10 is a flowchart illustrating another example method for decoding a current block in accordance with the techniques of this disclosure.

DETAILED DESCRIPTION

In general, this disclosure describes techniques for inter prediction in video codecs. More specifically, this disclosure describes methods related to affine motion derivation at the decoder side. The techniques of this disclosure may include dividing a block into a plurality of subblocks and determining initial subblock motion vector for each of the subblocks. The initial subblock motion vectors may be based on an affine merge candidate from a neighboring block and may represent an initial affine motion model.

A video coder may then perform a decoder side motion vector refinement (DMVR) process for each of the subblocks. The DMVR process may include performing bilateral matching for each of the subblocks. The DMVR process results in a refined subblock motion vector for each of the subblocks. For example, the bilateral matching process may return a motion vector offset value to add to the initial motion vector for each of the subblocks. Note that the initial motion vector, and the determined motion vector offset, may be different for each of the subblocks.

A video coder may then perform a linear regression process on the refined subblock motion vectors to derive an updated affine motion model. The video coder may determine control point motion vectors from the updated affine motion model and then code the block using the control point motion vectors. By applying a linear regression process to the refined subblock motion vectors, a more accurate affine motion model may be obtained. As such, coding efficiency may be improved and distortion may be reduced.

Figure 1:
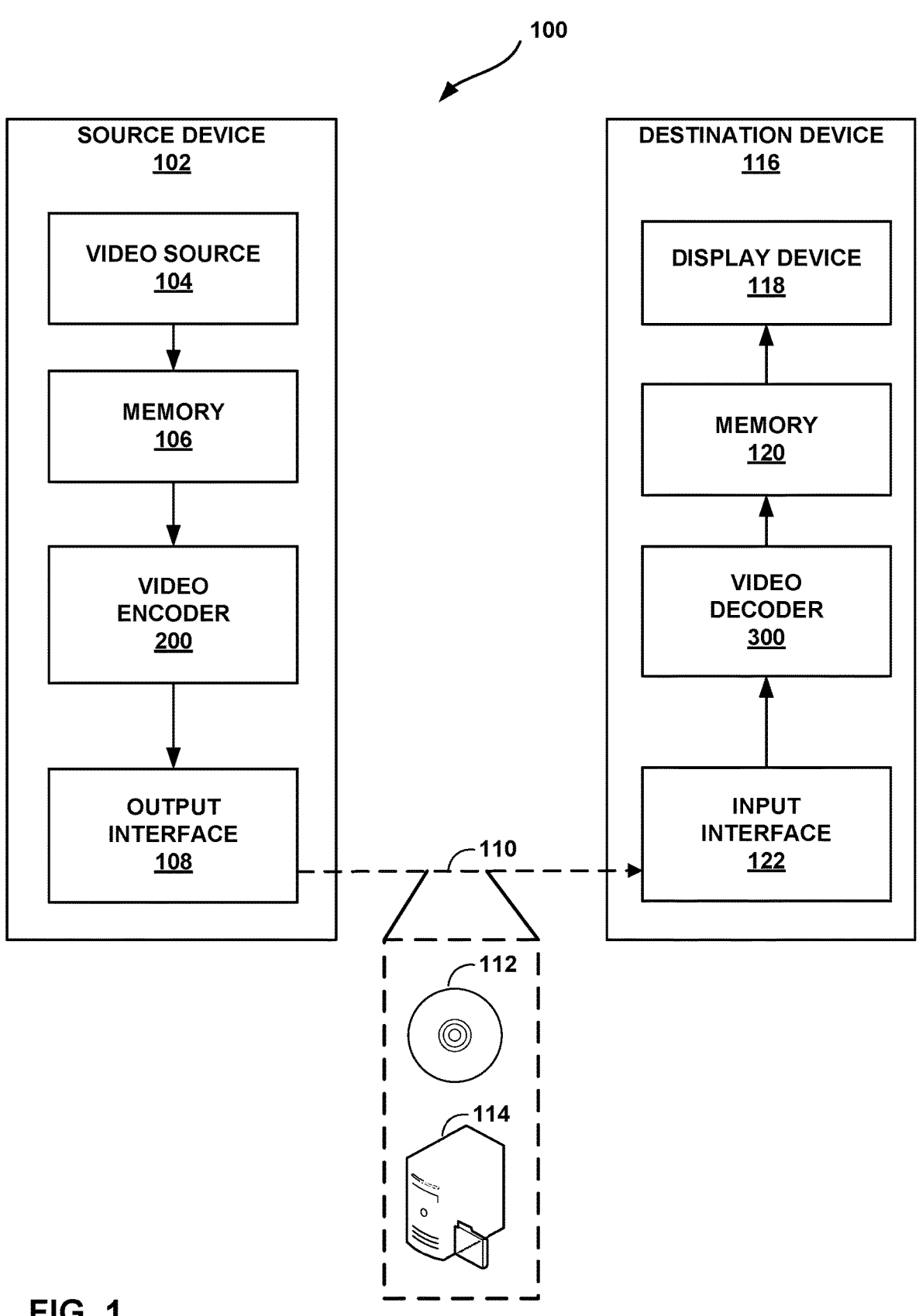
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure for regression-based decoder side affine motion derivation. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for regression-based decoder side affine motion derivation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for regression-based decoder side affine motion derivation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use affine mode.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder

200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be explained in more detail below, video encoder 200 and video decoder 300 may be configured to determine an affine motion model using regression-based techniques. In one example, video encoder 200 and video decoder 300 may be configured to partition a coding block into subblocks, generate initial subblock motion vectors for a plurality of the subblocks, refine the initial subblock motion vectors for the plurality of the subblocks using decoder side motion vector refinement to produce refined subblock motion vectors for the plurality of the subblocks, and perform a linear regression on the refined subblock motion vectors and coordinates of the plurality of the subblocks to derive an affine motion model. Video encoder 200 and video decoder 300 may then code the coding block using the affine motion model. For example, video encoder 200 and video decoder 300 may determine control point motion vectors from the derived affine motion model and code the coding block using the determined control point motion vectors.

Affine Mode

In some examples, an affine motion model can be described as follows:

$$\begin{cases} v_x = ax + by + e \\ v_y = cx + dy + f \end{cases},$$

wherein $(v_x, v_y)$ is a motion vector at the coordinate $(x, y)$, and a, b, c, d, e, and f are the six affine parameters. The above affine motion mode affine motion model may be referred to as a 6-parameters affine motion model. In some examples, video encoder 200 and video decoder 300 may be configured to partition a picture into blocks for block-based coding. The affine motion model for a block can also be described by the three motion vectors (MVS) $\vec{v}_0 = (v_{0x}, v_{0y})$, $\vec{v}_1 = (v_{1x}, v_{1y})$, and $\vec{v}_2 = (v_{2x}, v_{2y})$ at three different locations that are not in the same line. The three locations are usually referred to as control-points and the three motion vectors are referred to as control-point motion vectors (CPMVs). In the case when the three control-points are at three corners of the block, the affine motion can be described as follows:

$$\begin{cases} v_x = \dfrac{(v_{1x} - v_{0x})}{blkW} x + \dfrac{(v_{2x} - v_{0x})}{blkH} y + v_{0x} \\ v_y = \dfrac{(v_{1y} - v_{0y})}{blkW} x + \dfrac{(v_{2y} - v_{0y})}{blkH} y + v_{0y} \end{cases},$$

wherein blkW and blkH are the width and height of the block.

In affine mode, video encoder 200 and video decoder 300 may be configured to derive different motion vectors for each pixel in the block according to the associated affine motion model. Therefore, motion compensation can be performed in a pixel-by-pixel fashion. However, to reduce implementation complexity, subblock based motion compensation may be performed, wherein the block is partitioned into multiple subblocks (that have smaller block size) and each subblock is associated with one motion vector for block-based motion compensation.

Video encoder 200 and video decoder 300 may be configured to derive the motion vector for each subblock using the representative coordinate of the subblock. In some examples, the center position of the subblock is used as the representative coordinate. In one example, video encoder 200 and video decoder 300 may partition the block into non-overlapping subblocks. The block width is blkW, the block height is blkH, the subblock width is sbW, and the subblock height is sbH. In this example, there are blkH/sbH rows of subblocks and blkW/sbW subblocks in each row.

For a six-parameter affine motion model, the motion vector for the subblock (referred to as subblock MV) at the $i_{th}$ row (0<=i<blkW/sbW) and the $j_{th}$ (0<=j<blkH/sbH) column is derived as follows:

$$\begin{cases} v_x = \dfrac{(v_{1x} - v_{0x})}{blkW}\left(j * sbW + \dfrac{sbW}{2}\right) + \dfrac{(v_{2x} - v_{0x})}{blkH}\left(i * sbH + \dfrac{sbH}{2}\right) + v_{0x} \\ v_y = \dfrac{(v_{1y} - v_{0y})}{blkW}\left(j * sbW + \dfrac{sbW}{2}\right) + \dfrac{(v_{2y} - v_{0y})}{blkH}\left(i * sbH + \dfrac{sbH}{2}\right) + v_{0y} \end{cases}$$

Video encoder 200 and video decoder 300 may be configured to round the subblock MVs to a predefined precision and store the motion vectors in a motion buffer for motion compensation and motion vector prediction.

A simplified 4-parameter affine model (for zoom and rotational motion) is described as follows:

$$\begin{cases} v_x = ax - by + e \\ v_y = bx + ay + f \end{cases}$$

Similarly to the 6-parameter affine model, the 4-parameter affine model for a block can be described by two CPMVs: $\vec{v}_0 = (v_{0x}, v_{0y})$ and $\vec{v}_1 = (v_{1x}, v_{1y})$ at two corners (typically top-left and top-right) of the block. The motion field is then described as follows:

$$\begin{cases} v_x = \dfrac{(v_{1x} - v_{0x})}{blkW} x - \dfrac{(v_{1y} - v_{0y})}{blkW} y + v_{0x} \\ v_y = \dfrac{(v_{1y} - v_{0y})}{blkW} x + \dfrac{(v_{1x} - v_{0x})}{blkW} y + v_{0y} \end{cases}$$

The subblock MV at the $i_{th}$ row and the $j_{th}$ column is derived as follows:

$$\begin{cases} v_x = \dfrac{(v_{1x} - v_{0x})}{blkW}\left(j * sbW + \dfrac{sbW}{2}\right) - \dfrac{(v_{1y} - v_{0y})}{blkW}\left(i * sbH + \dfrac{sbH}{2}\right) + v_{0x} \\ v_y = \dfrac{(v_{1y} - v_{0y})}{blkW}\left(j * sbW + \dfrac{sbW}{2}\right) + \dfrac{(v_{1x} - v_{0x})}{blkW}\left(i * sbH + \dfrac{sbH}{2}\right) + v_{0y} \end{cases}$$

Prediction Refinement for Affine Mode

After sub-block based affine motion compensation is performed, video encoder 200 and video decoder 300 may be configured to refine the prediction signal. Refining the prediction signal may include adding an offset derived based on pixel-wise motion and the gradient of the prediction signal. The offset $\Delta I$ at location $(m, n)$ can be calculated as:

$$\Delta I(m,n) = g_x(m,n) * \Delta v_x(m,n) + g_y(m,n) * \Delta v_y(m,n),$$

wherein $g_x(m, n)$ is the horizontal gradient and $g_y(m, n)$ is the vertical gradient of the prediction signal, respectively. $\Delta v_x(m, n)$ and $\Delta v_y(m, n)$ are the differences in x and y components between the motion vector calculated at location pixel location $(m, n)$ and the subblock MV. The coordinate of the top-left sample of the subblock may be $(0,0)$. In that case, the center of the subblock is $$\left(\dfrac{sbW}{2}, \dfrac{sbH}{2}\right).$$

Given the affine motion parameters a, b, c, and d, $\Delta v_x(m, n)$ and $\Delta v_y(m, n)$ can be derived as follows:

$$\Delta v_x(m, n) = a * \left(m - \dfrac{sbW}{2}\right) + b * \left(n - \dfrac{sbH}{2}\right)$$

$$\Delta v_y(m, n) = c * \left(m - \dfrac{sbW}{2}\right) + d * \left(n - \dfrac{sbH}{2}\right)$$

In the control-points based affine motion model, video encoder 200 and video decoder 300 may calculate the affine motion parameters a, b, c, and d from the CPMVs as follows:

$$a = \frac{(v_{1x} - v_{0x})}{blkW}$$

$$b = \frac{(v_{2x} - v_{0x})}{blkH}$$

$$c = \frac{(v_{1y} - v_{0y})}{blkW}$$

$$d = \frac{(v_{2y} - v_{0y})}{blkH}$$

Regression-Based Affine Mode Derivation

In the Enhanced Compression Model version 6.0 (ECM6.0), linear regression based affine merge candidate derivation method proposed in Y. Zhang, et al, "Regression based affine derivation," Joint Video Experts Team (WET) of ITU-T SG 16 WP 3 and ISO/IEC JTC 1/SC 29, 27th Meeting, by teleconference, 13-22 Jul. 2022 (hereinafter "JVET-AA0107") was adopted. In the proposal, a linear regression process is applied to derive the affine motion model. The input to the linear regression is motion information and corresponding coordinates from a set of previously coded subblocks (e.g. neighbouring subblocks).

The objective of linear regression is to use independent variables whose values are known to predict the value of the single dependent value, which is unknown. Each predictor value is weighed, with the weights denoting their relative contribution to the overall prediction and added up to form the prediction. A general model for multivariate linear regression is given by $Y = a + b_1 X_1 + b_2 X_2 + \ldots + b_n X_n$, wherein Y is the dependent variable, and $X_1, \ldots, X_n$ are the n independent variables. In calculating the weights $a, b_1, \ldots, b_n$, the least square method is applied so that the mean square error between the statistical observation samples and the estimated value is minimized.

The affine motion model can be equivalently represented by two linear equations in matrix form as:

$$\begin{pmatrix} v_x \\ v_y \end{pmatrix} = \begin{pmatrix} a & b & e \\ c & d & f \end{pmatrix} \begin{pmatrix} x \\ y \\ 1 \end{pmatrix}$$

An affine motion model is essentially a linear equation of coordinates with certain coefficients. Given a set of N subblocks with corresponding motion vectors $(v_x, v_y)$ and coordinates (x, y), the linear coefficients $$\begin{pmatrix} a & b & e \\ c & d & f \end{pmatrix}$$

can be solved by linear regression. Examples of a linear regression process can be found in co-pending U.S. patent application Ser. No. 18/188,908, filed Mar. 23, 2023 and R. Ghaznavi-Youvalarim, A. Aminlou and J. Lainema, "Regression-Based Motion Vector Field for Video Coding", IEEE Transactions on Circuits and Systems for Video Technology Volume: 31, Issue: 5, May 2021.

As a general example, video encoder 200 and video decoder 300 may be configured to receive a current block of video data to be coded using an affine merge mode. Video encoder 200 and video decoder 300 may determine a refined affine model for the current block of video data from a multivariate linear regression process using a base motion vector field and a guidance motion vector field as inputs to the multivariate linear regression process. In one example, the base motion vector field may be determined from the affine model of a neighboring block coded using affine mode. The guidance motion vector field may include motion information from neighboring sub-blocks (e.g., adjacent sub-blocks to the current block). Video encoder 200 and video decoder 300 may the determine one or more affine merge candidates for the current block using the refined affine model, and code the current block of video data using the affine merge candidates. By refining the affine model of a neighbor block using motion information from adjacent sub-blocks, are more accurate affine model for the current block may be determined, thus producing more accurate affine merge candidates for the current block.

Decoder Side Motion Vector Refinement

In some example video codecs, such as the Versatile Video Coding (VVC) standard, video encoder 200 and video decoder 300 may be configured to apply bilateral-matching (BM) based decoder side motion vector refinement (DMVR) to increase the accuracy of the MVs of a bi-prediction merge candidate. When performing an example BM method, video encoder 200 and video decoder 300 may be configured to calculate a sum of absolute differences (SAD) between the two candidate blocks in reference picture list L0 (e.g., a first prediction direction) and reference picture list L1 (e.g., a second prediction direction).

Figure 2:
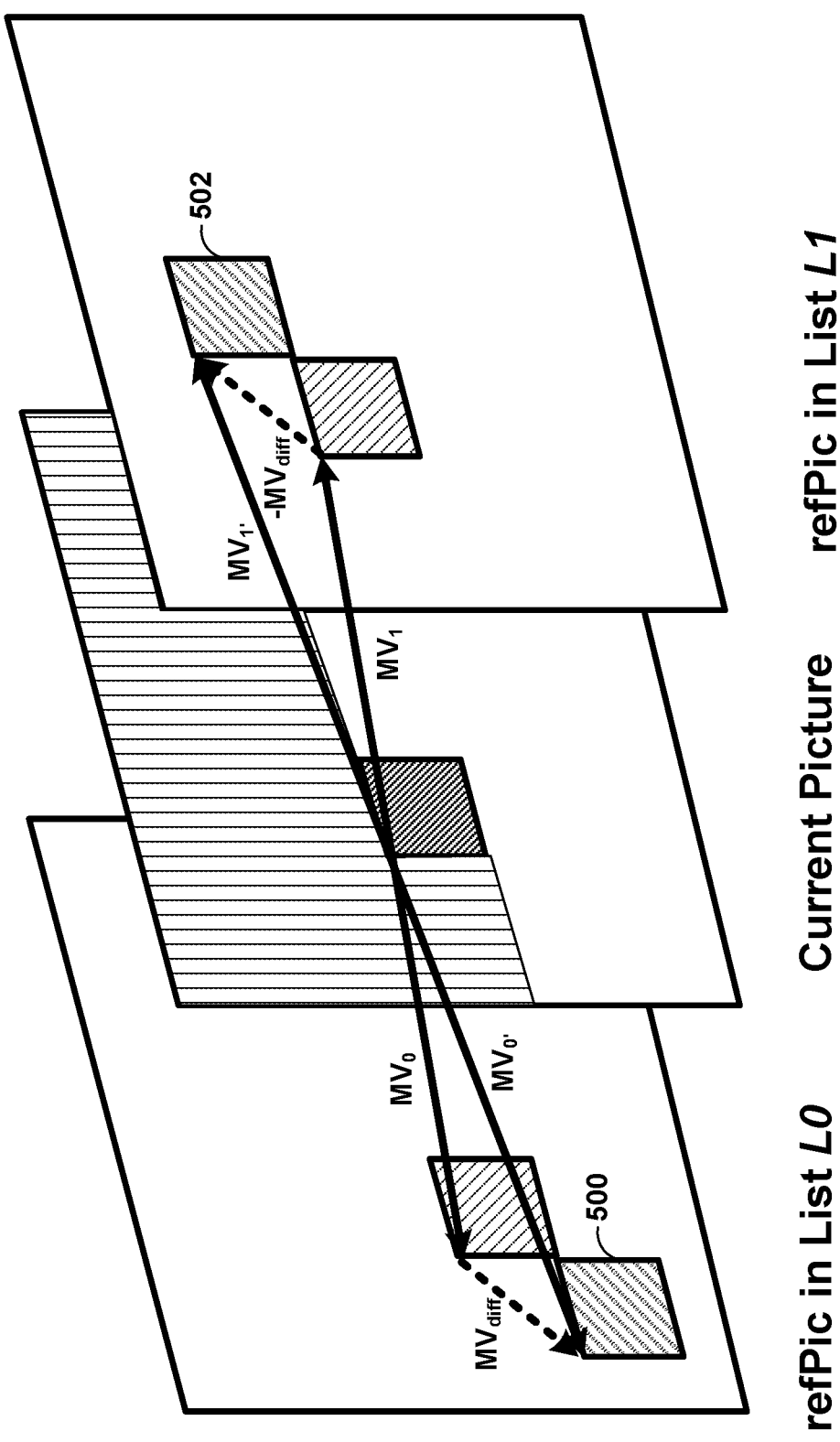
FIG. 2 is a conceptual diagram illustrating an example of bilateral matching.

As illustrated in FIG. 2, video encoder 200 and video decoder 300 may be configured to calculate the SAD between block 500 and block 502 based on each MV candidate around the initial MV. The SAD may be referred to as a distortion cost calculation or a bilateral matching cost calculation. The MV candidate with the lowest SAD becomes the refined MV and is used to generate the bi-predicted signal. In some examples, the SAD of the initial MVs is subtracted by ¼ of the SAD value to serve as regularization term. In the example of FIG. 2, the temporal distances (e.g., the Picture Order Count (POC) difference) from the two reference pictures to the current picture shall be the same, therefore, the motion vector difference of MV0 (MVD0) is just the opposite sign of the motion vector difference of MV1 (MVD1).

The refinement search range is two integer luma samples from the initial MV. The searching includes the integer sample offset search stage and fractional sample refinement stage. A 25 points full search is applied for integer sample offset searching. The SAD of the initial MV pair is first calculated. If the SAD of the initial MV pair is smaller than a threshold, the integer sample stage of DMVR is terminated. Otherwise, the SADs of the remaining 24 points are calculated and checked in raster scanning order. The point with the smallest SAD is selected as the output of integer sample offset searching stage.

The integer sample search is followed by fractional sample refinement. To reduce calculational complexity, the fractional sample refinement may be derived by using parametric error surface equation, instead of additional searching with SAD comparison. In one example, the fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C, \qquad (1)$$

where $(x_{min}, y_{min})$ corresponds to the fractional position with the least cost and C corresponds to the minimum cost value. By solving the above equations using the cost value of the five search points, the $(x_{min}, y_{min})$ is computed as:

$$x_{min}=(E(-1,0)-E(1,0))/(2(E(-1,0)+E(1,0)-2E(0,0))) \qquad (2)$$

$$y_{min}=(E(0,-1)-E(0,1))/(2((E(0,-1)+E(0,1)-2E(0,0))) \qquad (3)$$

The value of $x_{min}$ and $y_{min}$ are automatically constrained to be between −8 and 8 since all cost values are positive and the smallest value is E(0,0). This corresponds to a half-pel offset with $\frac{1}{16}$th-pel MV accuracy in VVC. The computed fractional values $(x_{min}, y_{min})$ are added to the integer distance refinement MV to get the sub-pixel accurate refinement delta MV.

In VVC, the resolution of the MVs is $\frac{1}{16}$ luma samples. The samples at the fractional positions are interpolated using an 8-tap interpolation filter. In DMVR mode, the search points are surrounding the initial fractional-pel MV with integer sample offset. Therefore, the samples of those fractional position are interpolated for the DMVR search process. To reduce the calculation complexity, a bi-linear interpolation filter is used to generate the fractional samples for the searching process in DMVR. Another effect is that, by using bi-linear filter is that with 2-sample search range, the DVMR process does not access more reference samples compared to normal motion compensation process. After the refined MV is attained with the DMVR search process, the normal 8-tap interpolation filter is applied to generate the final prediction. In order to not access more reference samples to the normal motion compensation process, the samples, which are not needed for the interpolation process based on the original MV but is needed for the interpolation process based on the refined MV, will be padded from those available samples.

When the width and/or height of a CU are larger than 16 luma samples, the CU will be further split into subblocks with widths and/or heights equal to 16 luma samples for the DMVR process.

In VVC, the DMVR process can be applied for the CUs which are coded with following modes and features:

CU level merge mode with bi-prediction MV

One reference picture is in the past and another reference picture is in the future with respect to the current picture The distances (i.e. POC difference) from two reference pictures to the current picture are same Both reference pictures are short-term reference pictures CU has more than 64 luma samples Both CU height and CU width are larger than or equal to 8 luma samples Bi-Prediction with CU-level Weights (BCW) weight index indicates equal weight Weighted Prediction (WP) is not enabled for the current block Combined inter-intra prediction (CIIP) mode is not used for the current block Decoder Side Motion Vector Refinement for Affine Merge Mode In J. Chen, et al, "Non-EE2: DMVR for affine merge coded blocks," Joint Video Experts Team (JVET) of ITU-T SG 16 WP 3 and ISO/IEC JTC 1/SC 29, 27$^{th}$ Meeting, by teleconference, 13-22 Jul. 2022 (hereinafter "JVET- AA0144"), decoder side motion vector refinement (DMVR) is proposed for bi-directional predicted affine merge candidate. In one example, video encoder 200 and video decoder 300 are configured to add a translation MV offset (e.g., a final offset or CPMV offset) to all of the CPMVs of the candidate in the affine merge list if the candidate meets the DMVR condition. Video encoder 200 and video decoder 300 may derive the MV offset (e.g., final offset) by minimizing the cost of bilateral matching, which is similar to the conventional DMVR process. The difference is that affine motion compensation is performed to generate predictors in both directions. The MV offset searching process is the same as the first pass of multi-pass DMVR (prediction unit level) in the enhanced compression mode (ECM). A 3×3 square search pattern is used to loop through the search range of possible candidate offsets (e.g., [−8, +8] in a horizontal direction and [−8, +8] in a vertical direction) to find the best integer MV offset. Then, a half pel search is conducted around the best integer position and an error surface estimation is performed at last to determine a MV offset with $\frac{1}{16}$ precision.

To calculate the bilateral matching cost (or more generally, a distortion cost) for the given bi-directional affine motion, the following process may be applied:

1) A candidate offset is added to each of the CPMVs in both directions to update the CPMVs.

2) Affine motion compensation is applied according to the updated CPMVs to generate the predictors in both directions.

3) Calculate the distortion between the generated predictors using the predefined cost criterion.

The candidate offset that has the lowest bilateral matching cost is selected as the final offset to the be added to the CPMVs. Typically, the affine motion compensation is subblock-based, wherein the current block is partitioned into non-overlapping subblocks. Regular motion compensation is performed for each of the subblocks, where all samples in the subblock share the same motion. In VVC, prediction refinement with optical flow (PROF) may be applied after the subblock-based motion compensation to further improve the predictor.

In co-pending U.S. patent application Ser. No. 18/351, 342, filed Jul. 12, 2023, (hereinafter, the '342 application) a lower complexity and more practical DMVR design for affine motion model is described. The DMVR design can be summarized as follows:

1) Divide the current block into subblocks.

2) Generate initial motion vectors (of both prediction directions) for each subblock (subblock motion fields) according to the initial affine motion model.

3) Loop over each subblock and calculate subblock bilateral matching cost for all possible offsets.

4) For each possible offset, accumulate the subblock bilateral matching cost to generate the bilateral matching cost corresponding to the entire block.

5) Determine the best offset by selecting the one with minimum bilateral matching cost corresponding to the entire block.

Note that in this way, the subblock motion field is generated only once instead of for each candidate offset.

The subblock size in the above process can be the same as that is used for affine motion compensation, typically 4×4. The subblocks can also be different sizes. In some examples, the subblocks size can be a larger subblock (8×8, 16×16 for examples), i.e., a fewer number of subblocks, to reduce the complexity of the DMVR process.

In step 3) above, given the offset and initial motion vectors (generated in step 2)), the candidate motion vectors can be derived (in the case of mirroring bilateral matching, the offset is added to the motion vector in one direction and subtracted from the motion vector in the other direction), then motion compensation is performed to generate the predictors for the corresponding subblock. The prediction refinement can be skipped for simplification. Also, note that pre-interpolation can be applied to generate predictors for all possible offsets in one step, which significantly reduces the complexity. Bilinear interpolation can be used instead of 8-tap (6-tap, or 12-tap) interpolation filters that are typically used for final motion compensation.

Parametric error surface based sub-pixel offsets estimation can also be applied after step 5) to generate the sub-pixel offset.

Certain size constraints can be applied. For example, DMVR is only applied to an affine block that is larger than N×N, wherein N is set equal to 8, 16, 32, et al. In another example, the size constraint depends on the subblock size used in the DMVR process, where N is set equal to the subblock size.

High level syntax may be used to control whether DMVR for the affine block is applied and signaled in the bitstream. For example, in the sequence parameter set, picture header, slice header, et al.

In co-pending U.S. Provisional Patent Application No. 63/377,659, filed Sep. 29, 2022, subblock skipping or sub-sampling is disclosed to further reduce the complexity, wherein a subset of subblocks may be used during the affine DMVR process.

For example, video encoder 200 and video decoder 300 may receive a current block of video data to be decoded using an affine DMVR mode. Video encoder 200 and video decoder 300 may divide the current block into a plurality of subblocks. In one example, to divide the block into a plurality of subblocks, video encoder 200 and video decoder 300 may subsample the plurality of subblocks to determine a first subset of the plurality of subblocks on which to perform the affine DMVR process.

In one example, the first subset of the plurality of subblocks is one half of the plurality of subblocks. For example, the first subset of the plurality of subblocks may include every other row of the plurality subblocks in the block or every other column of subblocks in the block. In another example, the first subset of the plurality of subblocks are in a checkerboard (or quincunx) pattern in the block. In other examples, the first subset of the plurality of subblocks is one quarter of the subblocks of the block, such as including subblocks in every other column and every other row of subblocks in the block.

Video encoder 200 and video decoder 300 may determine a final offset for the affine DMVR mode using the first subset of the plurality of subblocks. For example, video encoder 200 and video decoder 300 may determine the final offset for the affine DMVR mode using only the first plurality of subblocks, and may skip a bilateral matching cost calculation on a second subset of the plurality subblocks different from the first subset of the plurality of subblocks.

To determine the final offset, video encoder 200 and video decoder 300 may determine respective initial motion vectors (for both a first prediction direction and a second prediction direction) for each subblock that is not skipped (e.g., for a first subset of the subblocks) according to an initial affine motion model. Video encoder 200 and video decoder 300 may determine the initial affine motion model from a candidate affine motion model (e.g., candidate CPMVs or motion vectors) in an affine candidate merge list.

Video encoder 200 and video decoder 300 may generate a plurality of candidate motion vectors for each of subblock of the first plurality of subblocks. Generating the plurality of candidate motion vectors may adding each respective candidate offset, of a plurality of candidate offsets, to the respective initial motion vectors. For example, as described above, the candidates offsets may be in a search range of [−8, +8] in horizontal direction and [−8, +8] in the vertical direction. In other examples, other search ranges may be used.

Video encoder 200 and video decoder 300 may loop over each subblock that is not skipped (e.g., a first subset of the subblocks) and perform an affine motion compensation process to generate a predictor for each of the prediction directions. Based on these predictors, video encoder 200 and video decoder 300 may calculate subblock bilateral matching cost for all possible candidate offsets. For example, video encoder 200 and video decoder 300 may calculate respective bilateral matching costs for each subblock of the first plurality of subblocks for each of the plurality of candidate motion vectors.

For each possible offset, video encoder 200 and video decoder 300 may accumulate the respective subblock bilateral matching cost to generate the bilateral matching cost corresponding to all the subblocks that are not skipped (e.g., a first subset of the subblocks). For example, video encoder 200 and video decoder 300 may accumulate the respective bilateral matching costs for all subblock of the first plurality of subblocks for each of the plurality of candidate motion vectors to generate a respective accumulated bilateral matching cost.

Video encoder 200 and video decoder 300 may then determine the best offset by selecting the candidate offset with minimum accumulated bilateral matching cost corresponding to the entire block. For example, video encoder 200 and video decoder 300 may determine the final offset to be the respective candidate offset associated with a lowest respective accumulated bilateral matching cost.

Video encoder 200 and video decoder 300 may code (e.g., encode or decode, respectively), the block of video data using the final offset to generate a coded block of video data. In one example, to code the block of video data using the final offset, video encoder 200 and video decoder 300 may determine control point motion vectors for the block of video data, add the final offset to the control point motion vectors to create refined control point motion vectors, and code the block of video data using the refined control point motion vectors.

EXAMPLES

Figure 3:
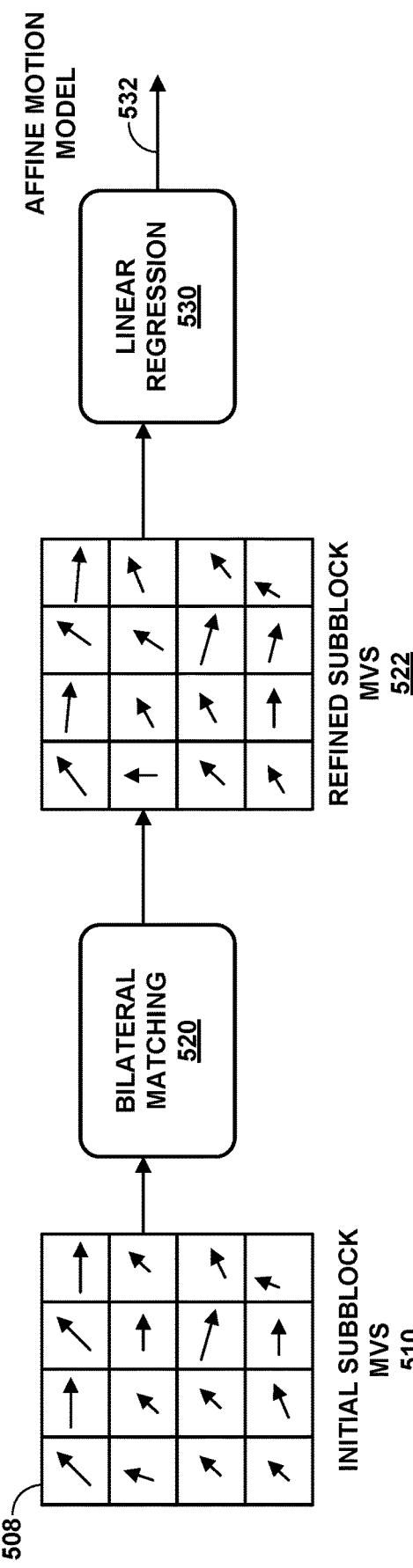
FIG. 3 is a conceptual diagram illustrating an example of regression-based decoder side affine mode derivation.

This disclosure describes techniques for regression-based decoder side affine motion derivation. An example method of the disclosure, as depicted in FIG. 3, can be summarized as follows:

A coding block is partitioned into subblocks, and corresponding initial subblock MVs are generated, typically from initial motion information for the coding block. In one example, the initial motion information may be an initial affine motion model from a candidate in affine merge list. In this example, the initial affine motion model may be represented by a set of control point motion vectors (e.g., 2 or 3 CPMVs).

A decoder-side motion vector refinement (DMVR) techniques, such as bilateral matching, is performed for each of the subblock to generate a set of refined MVs.

The refined MVs and the corresponding coordinates of those subblocks are used as input for the linear regression process. The output of the linear regression is a derived affine motion model.

Note that, depending on the application, the output affine model can be the affine parameters $$\begin{pmatrix} a & b & e \\ c & d & f \end{pmatrix},$$

but also can be control point motion vectors derived from such affine parameters. Also note that the initial motion information for the coding block may be bi-directional affine motion and therefore generates the initial subblock MVs according to an initial affine motion. In some examples, the initial motion information may also be regular bi-directional motion, and therefore, the generated initial subblock MVs are all equal to the initial bi-directional motion. However, after bilateral matching, the refined subblock MVs might not be the same for different subblocks.

Referring to FIG. 3, video encoder 200 and video decoder 300 may be configured to partition coding block 508 into a plurality of subblocks. In some examples, video encoder 200 and video decoder 300 may be configured to determine the size of the subblocks. That is, the size of the subblocks may vary per slice, picture, sequence, etc. In other examples, video encoder 200 and video decoder 300 may be configured to partition coding block 508 into fixed subblocks (e.g., 4×4 subblocks).

Video encoder 200 and video decoder 300 may then generate initial subblock motion vectors 510 for each of the subblocks. In one example, initial subblock motion vectors 510 may be based on control point motion vectors that represent an input affine motion model. For example, video encoder 200 and video decoder 300 may determine the control point motion vectors from a candidate in an affine merge list. In this example, based on the coordinates of the subblocks, it is possible that each of the subblocks have different initial subblock motion vectors. In other examples, when the initial subblock motion vectors are based on bi-predicted motion (e.g., the bi-predicted motion of a neighboring block), each of initial subblock motion vectors 510 may be the same.

In some examples of the disclosure, video encoder 200 and video decoder 300 may generate initial subblock motion vectors 510, and then refine those motion vectors, for all of the subblocks of coding block 508. In other examples, video encoder 200 and video decoder 300 may generate initial subblock motion vectors 510, and then refine those motion vectors, for a subset of subblocks of coding block 508. For example, video encoder 200 and video decoder 300 may use one-half, one-quarter, or any other subset, in any pattern, of the subblocks to perform the techniques of this disclosure.

Video encoder 200 and video decoder 300 may then use bilateral matching unit 520 to refine initial subblock motion vectors 510 for the plurality of the subblocks to produce refined subblock motion vectors 522. Said more generally, video encoder 200 and video decoder 300 may use a DMVR technique to produce the refined motion vectors. In this example, video encoder 200 and video decoder 300 may refine each of initial subblock motion vectors 510 independently using decoder side motion vector refinement (e.g., bilateral matching). For example, bilateral matching unit 520 may determine a bilateral matching cost for each of a plurality of candidate offsets for each of the subblocks independently (e.g., without regard to the costs determined for other subblocks). The candidate offset that results in the lowest bilateral matching cost for a particular subset is selected as the offset to use to generate the refined subblock motion vector for that subblock.

As such, because each of initial subblock motion vectors 510 is refined separately, the resulting refined subblock motion vectors do not necessarily fit an affine model because may not have linear correlation with each other. Linear regression unit 530 may perform a linear regression process on refined subblock motion vectors 522 to produce affine motion model 532. The linear regression process performed by linear regression unit 530 is described below in more detail below. This linear regression is sometimes referred to as multivariate linear regression or surface fitting. As described above, the output of linear regression unit 530 may be affine parameters (e.g., $$\begin{pmatrix} a & b & e \\ c & d & f \end{pmatrix},$$

but also can be control point motion vectors derived from such affine parameters. For example, video encoder 200 and video decoder 300 may be configured to derive control point motion vectors from affine parameters output by linear regression unit 530. Video encoder 200 and video decoder 300 may then code (e.g., encode and decode, respectively), based on the control point motion vectors determined from affine motion model 532. By applying a linear regression process to the refined subblock motion vectors, a more accurate affine motion model may be obtained. As such, coding efficiency may be improved and distortion may be reduced.

In some examples, video encoder 200 and video decoder 300 may not necessarily use affine motion model 532 to code coding block 508. Instead, the control point motion vectors determined from affine motion model 532 may be one possible set of motion information, from among two or more sets of motion information, that video encoder 200 and video decoder 300 may choose between when determining how to code coding block.

Figure 4:
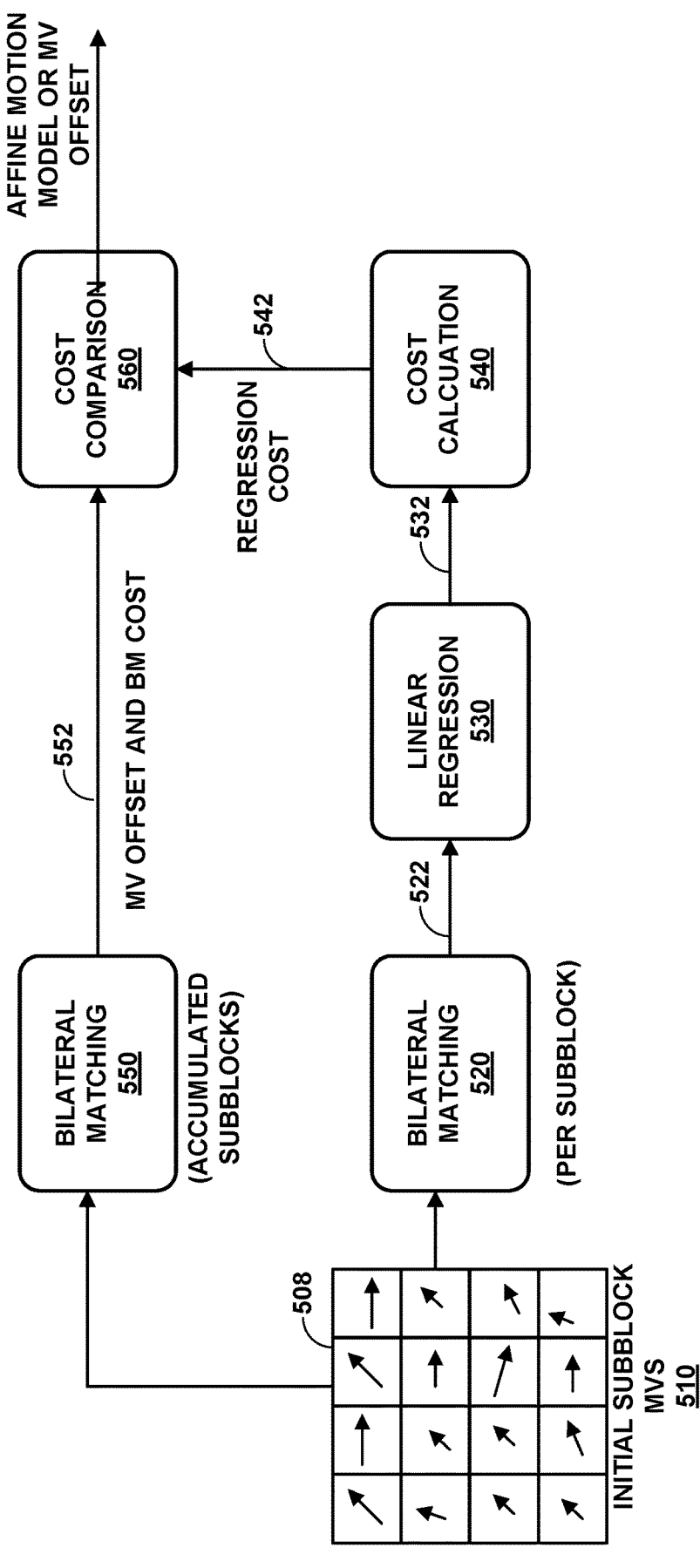
FIG. 4 is a conceptual diagram illustrating another example of regression-based decoder side affine mode derivation.

FIG. 4 is a conceptual diagram illustrating another example of regression-based decoder side affine mode derivation in accordance with this example. The bottom track of FIG. 4 is the same as that shown in FIG. 3. That is, video encoder 200 and video decoder 300 are configured to refine initial subblock motion vectors 510 and perform a linear regression process on refined subblock motion vectors 522 to produce affine motion model 532. Substantially in parallel with this process, video encoder 200 and video decoder 300 may perform a different DMVR process on initial subblock motion vectors 510 using bilateral matching unit 550. Rather than refining each of the initial subblock motion vectors independently (e.g., per subblock), bilateral matching unit 550 determines a motion vector offset, from a plurality of candidate motion vector offsets, that achieves the lowest bilateral matching (BM) cost for all subblocks in coding block 508 (e.g., a BM cost accumulated for all subblocks).

For example, bilateral matching unit 550 may perform the DMVR process described above that can be summarized as follows:

Divide coding block 508 into subblocks.

Generate initial subblock motion vectors 510 for each subblock according to an initial affine motion model.

Loop over each subblock and calculate subblock bilateral matching cost for all possible motion vector offsets.

For each possible motion vector offset, accumulate the subblock bilateral matching cost to generate the bilateral matching cost corresponding to the entire block.

Determine the best motion vector offset by selecting the one with minimum bilateral matching cost corresponding to the entire block.

The output of bilateral matching unit 550 is a motion vector offset and a BM cost 552. Video encoder 200 and video decoder 300 may then use cost calculation unit 540 to determine a bilateral matching cost (e.g., regression cost 542) for the control point motion vectors derived from affine motion model 532. Cost comparison unit 560 may then determine if BM cost 552 or regression cost 542 is lowest. If regression cost 542 is lowest, video encoder 200 and video decoder 300 will use the control point motion vectors derived from the regression process (e.g., affine motion model 532) to code coding block 508. If BM cost 552 is lowest, video encoder 200 and video decoder 300 will use the motion vector offset derived from the bilateral matching unit 550 to code coding block 508. The motion vector offset is added to the input motion information (e.g., input control point motion vectors) to derive refined control point motion vectors. Video encoder 200 and video decoder 300 then code coding block 508 using the refined control point motion vectors. By using both regression-based refinement and DMVR at the same time, more options for refined control point motion vectors are generated, thus increasing the chances for improved coding efficiency and/or reduced distortion.

Application to Affine Merge Candidate—Example 1

The following describe an application of decoder side motion refinement for a bi-directional predicted affine merge candidate. Inputs to this process are:

a luma location (xCb, yCb) specifying the top-left sample of the current luma coding block relative to the top-left luma sample of the current picture, two variables cbWidth and cbHeight specifying the width and the height of the current luma coding block, luma affine control point motion vectors cpMvLX[cpIdx] with cpIdx=0 . . . numCpMv−1 and X being 0 or 1, the number of control point motion vectors numCpMv.

Output of this process are the refined luma affine control point motion vectors refinedCpMvLX[cpIdx] with cpIdx=0 . . . numCpMv−1 and X being 0 or 1.

1) Determine the subblock's width sbWidth and the subblock's height sbHeight. Note that in some examples, the subblock size may be fixed.

2) Determine the step size in x-direction stepX and step size in y-direction stepY. Note that in some examples the use and determination of a step size may be skipped. Additional, in some examples, a subblock may be subsampled. For example, if the subblock width is X (e.g., 4 samples wide), but the stepX is 8, meaning that the first left x-coordinate of the subblock is 0, the subblock coordinate at x-coordinate 4 is skipped, and the second subblock's left x-coordinate is 8, etc.

3) Determine a list of subblocks, the luma location (xSb[sbIdx], ySb[sbIdx]) specifying the top-left sample of the subblock relative to the top-left luma sample of the current picture, with sbIdx=0 . . . numSubBlk−1, numSubBlk specifying the number of subblocks.

4) Determine the subblock motion vectors sbMvLX[sbIdx] with sbIdx=0 . . . numSubBlk−1 and X being 0 or 1. The subblock motion vectors are based on luma affine control point motion vectors cpMvLX[cpIdx]

5) For sbIdx=0 . . . numSubBlk−1, the following applies:
   a. Derive the bilateral matching cost array of the subblock bmCost[sbIdx][dX+srchRng][dY+srchRng] with dX=−srchRng . . . srchRng and dY=−srchRng . . . srchRng, wherein srchRng represents the search range.
   b. Determine an integer delta motion vector dSbMv[sbIdx]=(dXBest, dYBest) such that bmCost[sbIdx][dXBest+srchRng][dYBest+srchRng] corresponds to the minimum value in the 2-D array bmCost[sbIdx]. The refined subblock motion vectors are refinedSbMvLX[sbIdx] for X being 0 or 1. refinedSbMvL0[sbIdx]=sbMvL0[sbIdx]+dSbMv[sbIdx], refinedSbMvL1[sbIdx]=sbMvL1[sbIdx]−dSbMv[sbIdx].
   c. Determine subpel delta motion vector dSbMvSubPel[sbIdx] of the subblock. refinedSbMvL0[sbIdx]=refinedSbMvL0[sbIdx]+dSbMvSubPel[sbIdx], refinedSbMvL1[sbIdx]=refinedSbMvL1[sbIdx]−dSbMvSubPel[sbIdx]. Subpel bilateral matching search or error surface based derivation (with bmCost[sbIdx] as input) may be used for the process.

6) Derive the bilateral matching cost array of the coding block bmCostTotal[dX+2][dY+2] with dX=−srchRng . . . srchRng and dY=−srchRng . . . srchRng, by summation of bmCost over sbIdx=0 . . . numSubBlk−1.

7) Determine an integer delta motion vector dMv=(dMvXIntBest, dMvYIntBest) such that minCost=bmCostTotal[dMvXIntBest+srchRng][dMvYIntBest+srchRng] corresponds to the minimum value in the 2-D array bmCostTotal. refinedCpMvL0[cpIdx] is set equal to cpMvL0[cpIdx]+dMv, refinedCpMvL1[cpIdx] is set equal to cpMvL1[cpIdx]−dMv with cpIdx=0 . . . numCpMv−1.

8) Determine subpel delta motion vector dMvSubPel of the coding block. Subpel bilateral matching search or error surface based derivation (with bmCostTotal as input) may be used for the process. If subpel bilateral matching search is applied, minCost may be updated accordingly.

9) refinedCpMvL0[cpIdx] is set equal to refinedCpMvL0[cpIdx]+dMvSubPel, refinedCpMvL1[cpIdx] is set equal to refinedCpMvL1[cpIdx]−dMvSubPel with cpIdx=0 . . . numCpMv−1.

10) The linear regression process is invoked with (xCb, yCb), cbWidth, cbHeight, refinedSbMvLX[sbIdx] and (xSb[sbIdx]+sbWidth/2, ySb[sbIdx]+sbHeight/2) as input. The output are derived control point motion vectors cpMvRegressionLX[cpIdx] with cpIdx=0 . . . numCpMv−1.

11) Derive the bilateral matching cost bmCostRegression corresponding to cpMvRegressionLX[cpIdx] with cpIdx=0 . . . numCpMv−1. If bmCostRegression is less than minCost, then refinedCpMvLX[cpIdx] is set equal to cpMvRegressionLX [cpIdx] with cpIdx=0 . . . numCpMv−1.

In some example, step 5).c may not be applied. In another example, step 8) may not be applied. In still another example, an early skip process may be applied after step 7), wherein the process stops when minCost is smaller than a predefined threshold (e.g., the area of the coding block).

Different cost criterion may be applied, e.g., the sum of absolute difference, the sum of absolute Hamdard transformed difference, or other cost criterion. Some cost regularization term that depends on delta motion vector may also be added to the cost. In one example, the regularization term is s*(abs(dMvX)+abs(dmvY)), wherein s is a scaling factor, and (dMvX, dMvY) is the delta motion vector.

In another example, the cost is adjusted or scaled depending on the delta motion vector, wherein the larger magnitude the delta motion vector, the larger the scaling factor. For example:

If dMvX and dMvY are both equal to 0, bmCostTotal [dX+2][dY+2] is set equalt to bmCostTotal[dX+2] [dY+2]−(bmCostTotal[dX+2][dY+2]>>2), Otherwise if abs(dMvX)+abs(dmvY)>=4 and abs (dMvX)+abs(dmvY)<7, bmCostTotal[dX+2][dY+2] is set equalt to bmCostTotal[dX+2][dY+2]+(bmCostTotal [dX+2][dY+2]>>2)

Different cost criterion may also be applied for different steps.

Application to Affine Merge Candidate—Example 2

The following described an another example method for determining an affine motion mode that does not require linear regression. In this example, refined subblock motion vectors from corner subblocks (e.g., 3 corners) of a block are used to determine the affine motion model. For example, the numCpMv corner subblock's refined MVs (typically at locations (xCb, yCb), (xCb+cbWidth−sbWidth, yCb) and (xCb, yCb+cbHeight−sbHeight)) are used as the derived control point motion vectors.

Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
luma affine control point motion vectors cpMvLX[cpIdx] with cpIdx=0 . . . numCpMv−1 and X being 0 or 1,
the number of control point motion vectors numCpMv.
Output of this process are the refined luma affine control point motion vectors refinedCpMvLX[cpIdx] with cpIdx=0 . . . numCpMv−1 and X being 0 or 1.

Determine the subblock's width sbWidth and the subblock's height sbHeight.

Determine the step size in x-direction stepX and step size in y-direction stepY.

Determine a list of subblocks, the luma location (xSb [sbIdx], ySb[sbIdx]) specifying the top-left sample of the subblock relative to the top-left luma sample of the current picture, with sbIdx=0 . . . numSubBlk−1, numSubBlk specifying the number of subblocks.

Determine the subblock motion vectors sbMvLX[sbIdx] with sbIdx=0 . . . numSubBlk−1 and X being 0 or 1.

For sbIdx=0 . . . numSubBlk−1, the following applies:
a. Derive the bilateral matching cost array of the subblock bmCost[sbIdx][dX+srchRng][dY+srchRng] with dX=−srchRng . . . srchRng and dY=−srchRng . . . srchRng, wherein srchRng represents the search range.
b. Determine an integer delta motion vector dSbMv [sbIdx]=(dXBest, dYBest) such that bmCost[sbIdx]

[dXBest+srchRng][dYBest+srchRng] corresponds to the minimum value in the 2-D array bmCost[sbIdx]. The refined subblock motion vectors are refinedSbMvLX[sbIdx] for X being 0 or 1. refinedSbMvL0 [sbIdx]=sbMvL0[sbIdx]+dSbMv[sbIdx], refinedSbMvL1[sbIdx]=sbMvL1[sbIdx]−dSbMv[sbIdx].
c. Determine subpel delta motion vector dSbMvSubPel [sbIdx] of the subblock. refinedSbMvL0[sbIdx]=refinedSbMvL0[sbIdx]+dSbMvSubPel[sbIdx], refinedSbMvL1[sbIdx]=refinedSbMvL1[sbIdx]−dSbMvSubPel[sbIdx]. Subpel bilateral matching search or error surface based derivation (with bmCost [sbIdx] as input) may be used for the process.

Derive the bilateral matching cost array of the coding block bmCostTotal[dX+2][dY+2] with dX=−srchRng . . . srchRng and dY=−srchRng . . . srchRng, by summation of bmCost over sbIdx=0 . . . numSubBlk−1.

Determine an integer delta motion vector dMv=(dMvX-IntBest, dMvYIntBest) such that minCost=bmCostTotal [dMvXIntBest+srchRng][dMvYIntBest+srchRng] corresponds to the minimum value in the 2-D array bmCostTotal. refinedCpMvL0[cpIdx] is set equal to cpMvL0[cpIdx]+ dMv, refinedCpMvL1[cpIdx] is set equal to cpMvL1 [cpIdx]−dMv with cpIdx=0 . . . numCpMv−1.

Determine subpel delta motion vector dMvSubPel of the coding block. Subpel bilateral matching search or error surface based derivation (with bmCostTotal as input) may be used for the process. If subpel bilateral matching search is applied, minCost may be updated accordingly.

refinedCpMvL0[cpIdx] is set equal to refinedCpMvL0 [cpIdx]+dMvSubPel, refinedCpMvL1[cpIdx] is set equal to refinedCpMvL1[cpIdx]−dMvSubPel with cpIdx=0 . . . numCpMv−1.

Select the numCpMv corner subblock's refined MVs (typically at locations (xCb, yCb), (xCb+cbWidth−sbWidth, yCb) and (xCb, yCb+cbHeight−sbHeight)) as the derived control point motion vectors cpMvCornerLX[cpIdx] with cpIdx=0 . . . numCpMv−1.

Derive the bilateral matching cost bmCostDerived corresponding to cpMvCornerLX[cpIdx] with cpIdx=0 . . . numCpMv−1. If bmCostDerived is less than minCost, then refinedCpMvLX[cpIdx] is set equal to cpMvCornerLX [cpIdx] with cpIdx=0 . . . numCpMv−1.

Linear Regression

The following describe example of linear regression to derive an updated affine motion model (and refined control point motion vectors generated from the updated affine motion model) using the initial affine motion model and the refined subblock motion vectors, as described above. However, note that other linear regression method might be applied as well.

Multivariate linear regression, also known as multiple regression, is a statistical technique that can be used to analyze the relationship between a single dependent variable and several independent variables. The objective of a multiple regression analysis is to use the independent variables whose values are known to predict the value of the single dependent value which is unknown. Each predictor value is weighed, with the weights denoting their relative contribution to the overall prediction and are summed to form the prediction. A general model for multivariate linear regression is given by Equation (1):

$$Y = a + b_1 X_1 + b_2 X_2 + \ldots + b_n X_n \quad (1)$$

In Equation (1), Y is the dependent variable, and $X_1, \ldots, X_n$ are the n independent variables. In one example, a least square method may be used to calculate the weights a, $b_1$, . . . , $b_n$, where the mean square error between the statistical observation samples and the estimated value is minimized.

In VVC, a block-based affine transform motion compensation prediction is applied to better represent zoom in/out, rotation, perspective motions and the other irregular motions in which motion vector of each sub-block is derived based on a linear model. A motion vector at sample location (x, y) of a sub-block center is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

In Equation (2), taking $mv_x$ as an example, $mv_{0x}$, $mv_{1x}$, and $mv_{2x}$ are the horizontal motion vector components of the top-left, top-right and bottom-left control point motion vectors (CPMVs), respectively, which are known for a given affine model. W and H are the width and height of the current CU, which are also known. In this case, the equation to derive $mv_x$ can be written in the formulae of linear regression. The same technique can be applied to $mv_y$. With this observation, the affine motion model can be equivalently represented by two linear equations in matrix form as:

$$\begin{pmatrix} mv_x \\ mv_y \end{pmatrix} = \begin{pmatrix} b_{x0} & b_{x1} & b_{x2} \\ b_{y0} & b_{y1} & b_{y2} \end{pmatrix} \begin{pmatrix} x \\ y \\ 1 \end{pmatrix} \quad (3)$$

Where $$b_{x0} = \frac{mv_{1x} - mv_{0x}}{W}, b_{x1} = \frac{mv_{2x} - mv_{0x}}{H} \text{ and } b_{x2} = mv_{0x};$$

$$b_{y0} = \frac{mv_{1y} - mv_{0y}}{W}, b_{y1} = \frac{mv_{2y} - mv_{0y}}{H}$$

and $b_{y2} = mv_{0y}$, respectively.

With the above equation, the derivation process of an affine motion model can be seen as essentially the derivation process of certain coefficients in a linear equation. The estimation of the linear coefficients can be solved by a multivariate linear regression process.

To apply the multivariate linear regression process to affine model derivation, a video coder may obtain the motion vector information and its corresponding sub-block coordinate. The coordinates are the independent variables while the motion vector component is the dependent variable. Given N motion vectors and their corresponding sub-block center coordinates, the affine model parameters can be derived using the following equations:

$$b_{c,d} = \frac{\det(B^{c,d})}{\det(A)}, \quad (4)$$

where $\det(B^{c,d})$ and $\det(A)$ are the determinant of matrix $B^{c,d}$ and matrix A, respectively, and $B^{c,d}$ and A are both 3×3 matrices. For a 3×3 matrix, the determinant can be computed by the following equation:

$$\det(M) = (M_{0,0} \times M_{1,1} \times M_{2,2} \times M_{1,0} \times M_{2,1} \times M_{0,2} \times M_{2,0} \times M_{0,1} \times M_{1,2}) - (M_{0,0} \times M_{2,1} \times M_{1,2} + M_{1,0} \times M_{0,1} \times M_{2,2} + M_{2,0} \times M_{1,1} \times M_{0,2}) \quad (5)$$

where $M_{i,j}$ is the element located at position (i,j) of the matrix and i,j∈{0, 1, 2}.

For the construction of matrices $B^{c,d}$ and A, the following equations are used:

$$sumMVl_{c,d} = \sum_{k=0}^{N-1}\left(MV_c^k \times l_d^k\right) \quad (6)$$

$$sumll_{i,j} = \sum_{k=0}^{N-1}\left(l_i^k \times l_j^k\right) \quad (7)$$

$$A_{i,j} = sumll_{i,j} \quad (8)$$

$$B_{i,j}^{c,d} = \begin{cases} sumMVl_{c,d}; & j = d \\ sumll_{i,j}; & \text{Otherwise} \end{cases} \quad (9)$$

$$\text{where:} \begin{cases} c \in \{x, y\} \\ d, i, j \in \{0, 1, 2\} \\ k \in \{0, 1, \dots, N-1\} \\ l_0 : \text{center location } x \text{ of } 4 \times 4 \text{ block} \\ l_1 : \text{center location } y \text{ of } 4 \times 4 \text{ block} \\ l_2 = 1 \end{cases}$$

With this method, a more optimal affine model can be derived to better describe the input motion vectors considering its corresponding coordinates in a minimum mean square error sense.

To elaborate, an example is given here to illustrate how a video coder may determine an output linear model from the input motion vector field. In this example, the video coder has obtained motion information from certain motion vector fields, and the N motion vectors can be denoted by {($mv_{x0}$, $mv_{y0}$), ($mv_{x1}$, $mv_{y1}$), . . . , ($mv_{xN-1}$, $mv_{yN-1}$)}, and the corresponding center coordinates are denoted as {($x_0$, $y_0$), ($x_1$, $y_1$), . . . , ($x_{N-1}$, $y_{N-1}$)}.

In a first step, a video coder may determine an anchor coordinate that serves as the origin of the output linear model instead of using (0, 0), which is the top-left coordinate of the whole picture, to avoid large values in computation. This is also being done for the ease of deriving the affine merge candidate after the linear model parameters are derived from the linear regression process. Usually, a video coder may be configured to use the top-left coordinate of the current CU as the origin. Denoting the origin by ($x_{tl}$, $y_{tl}$), a relative coordinate is computed by subtracting ($x_{tl}$, $y_{tl}$) from each of the sub-block center coordinate. By doing this, the video coder may obtain {($x_0-x_{tl}$, $y_0-y_{tl}$), ($x_1-x_{tl}$, $y_1-y_{tl}$), . . . , ($x_{N-1}-x_{tl}$, $y_{N-1}-y_{tl}$)}. Given the following:

$$x_i' = x_i - x_{tl}$$

$$y_i' = y_i - y_{tl}$$

where i∈{0, 1, . . . , N−1}, then the video coder obtains {($x_0'$, $y_0'$), ($x_1'$, $y_1'$), . . . , ($x_{N-1}'$, $y_{N-1}'$)}.

For motion vectors, a video coder may also select an initial motion vector to be subtracted from to avoid large values in computation, but this is not essential since motion vector values are relatively small compared to the coordinate value. Also, motion vectors can have negative value and subtracting a negative value from a positive value only ends up with an even larger positive value.

The output linear model parameters can be estimated using a mean square error (MSE) minimization method, for the N available neighboring MVs, where the MSE is calculated as the average of the squared difference between the estimated MVs {($mv_{x0}'$, $mv_{y0}'$), ($mv_{x1}'$, $mv_{y1}'$), . . . , ($mv_{xN-1}'$, $mv_{yN-1}'$)}, and the actual values of the input MVs {($mv_{x0}$, $mv_{y0}$), ($mv_{x1}$, $mv_{y1}$), . . . , ($mv_{xN-1}$, $mv_{yN-1}$)}, for horizontal and vertical components separately, as shown in the following equation:

$$MSE_c = \Sigma_{k=0}^{N-1}(MV_c - MV_c'),\qquad(10)$$

where $c \in \{x, y\}$ denotes the horizontal or vertical component of the motion vectors.

Mathematically, the solution to the MSE minimization is given by Equation (4).

Taking the derivation of parameter $b_{x,0}$ as one example, matrix A is derived by $A_{i,j}=\text{sum}l'l'_{i,j}$ with $i,j \in \{0, 1, 2\}$, where $l'_0$ is the x' of each sub-block, $l'_1$ is the y' of each sub-block and $l'_2=1$ for all sub-blocks. Matrix A element at position (0,0) denoted by $A_{0,0}=\text{sum}ll_{0,0}=\Sigma_{k=0}^{N-1}(l'_0{}^k \times l'_0{}^k)=\Sigma_{k=0}^{N-1}(x_k' \times x_k')$. Similarly, the other elements in matrix A can be derived.

For matrix B, when deriving $b_{x,0}$, matrix $B^{x,0}$ may also be derived. From equation (9), all the matrix elements $B_{i,j}{}^{x,0}$ except for $B_{0,0}{}^{x,0}$, $B_{1,0}{}^{x,0}$ and $B_{2,0}{}^{x,0}$, since j=d=0 here, are equal to element $A_{i,j}$ from matrix A. For elements $B_{i,0}{}^{x,0}$, taking $B_{0,0}{}^{x,0}$ as an example, $B_{0,0}{}^{x,0}=\text{sum}MVl'_{x,0}=\Sigma_{k=0}^{N-1}(MV_x{}^k \times l'_0{}^k)=\Sigma_{k=0}^{N-1}(MV_x{}^k \times x_k')$. Similarly, $B_{1,0}{}^{x,0}$ and $B_{2,0}{}^{x,0}$ can be derived.

With matrix A and $B^{x,0}$, coefficient $$b_{x,0} = \frac{\det(B^{x,0})}{\det(A)},$$

and the determinant of a 3×3 matrix can be computed using equation (5).

Applying a similar procedure to other coefficients, all the linear model parameters $$\begin{pmatrix} b_{x0} & b_{x1} & b_{x2} \\ b_{y0} & b_{y1} & b_{y2} \end{pmatrix}$$

can be solved.

With the estimated parameters, the affine merge candidate for the current CU can be derived using equation (2) with the top-left, top-right and bottom-left CPMVs denoted as ($mv_{tl}$, $mv_{tl}$), ($mv_{tr}$, $mv_{tr}$), ($mv_{bl}$, $mv_{bl}$) equal to:

$$(mv_{tl},mv_{tl})=(b_{x2},b_{y2})$$

$$(mv_{tr},mv_{tr})=(b_{x0}W+b_{x2},b_{y0}W+b_{y2})$$

$$(mv_{bl},mv_{bl})=(b_{x1}H+b_{x2},b_{y1}H+b_{y2})$$

where W and H are the width and height of the current CU. The variables x and y in equation (2) are replaced by the relative distance from the top-left position of the current CU to the position of the corresponding CPMV.

Figure 5:
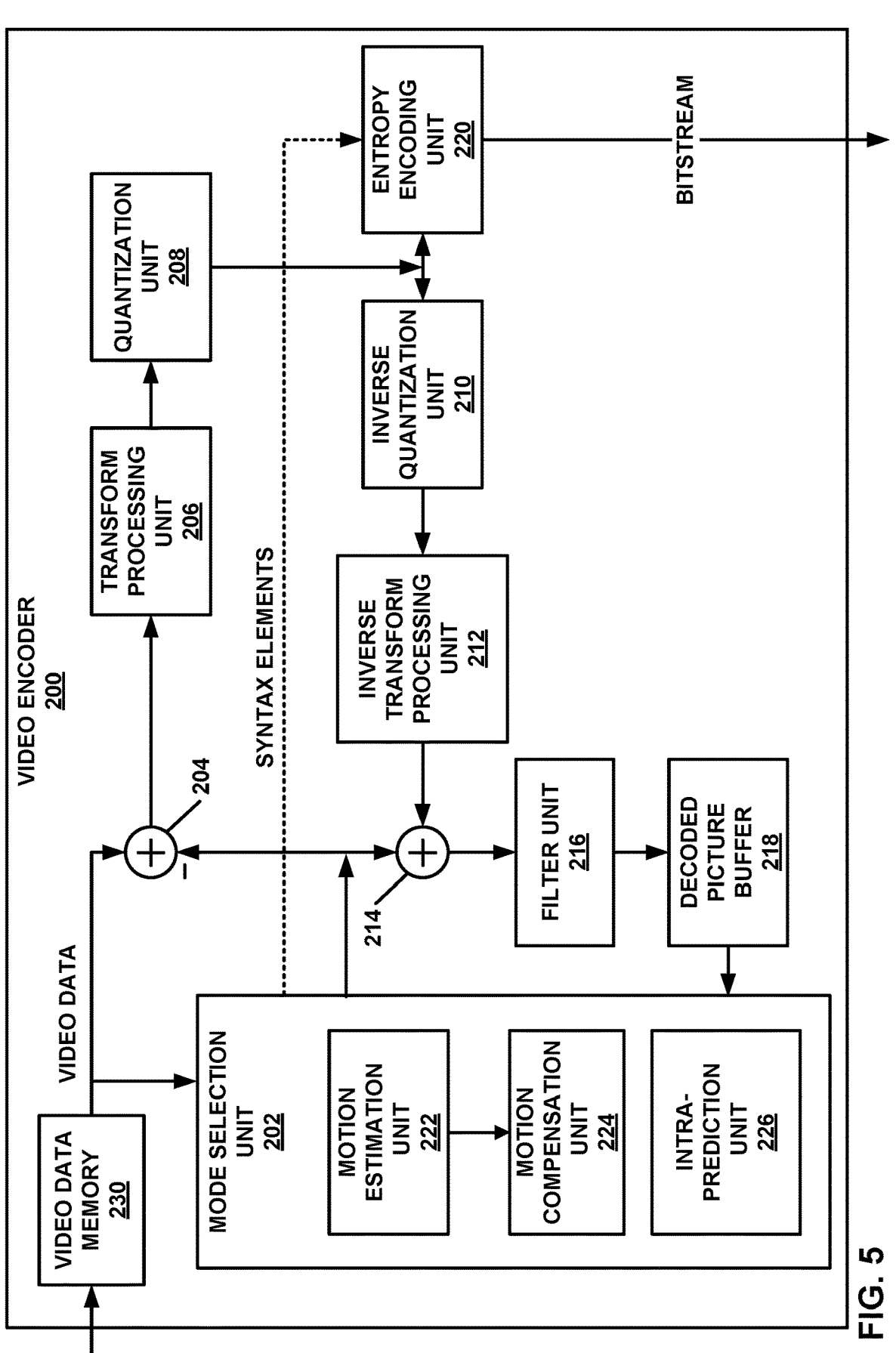
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

In accordance with the techniques of this disclosure, as was explained above, motion estimation unit 222 may be configured to determine an affine motion model using regression-based techniques. In one example, video encoder 200 may be configured to partition a coding block into subblocks. Motion estimation unit 222 may generate initial subblock motion vectors for a plurality of the subblocks, and refine the initial subblock motion vectors for the plurality of the subblocks using decoder side motion vector refinement to produce refined subblock motion vectors for the plurality of the subblocks. Motion estimation unit 222 may perform a linear regression on the refined subblock motion vectors and coordinates of the plurality of the subblocks to derive an affine motion model. Motion compensation unit 224 may then encode the coding block using the affine motion model. For example, motion compensation unit 224 may determine control point motion vectors from the derived affine motion model and encode the coding block using the determined control point motion vectors.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to partition a coding block into subblocks, generate initial subblock motion vectors for a plurality of the subblocks, refine the initial subblock motion vectors for the plurality of the subblocks using decoder side motion vector refinement to produce refined subblock motion vectors for the plurality of the subblocks, and perform a linear regression on the refined subblock motion vectors and coordinates of the plurality of the subblocks to derive an affine motion model.

Figure 6:
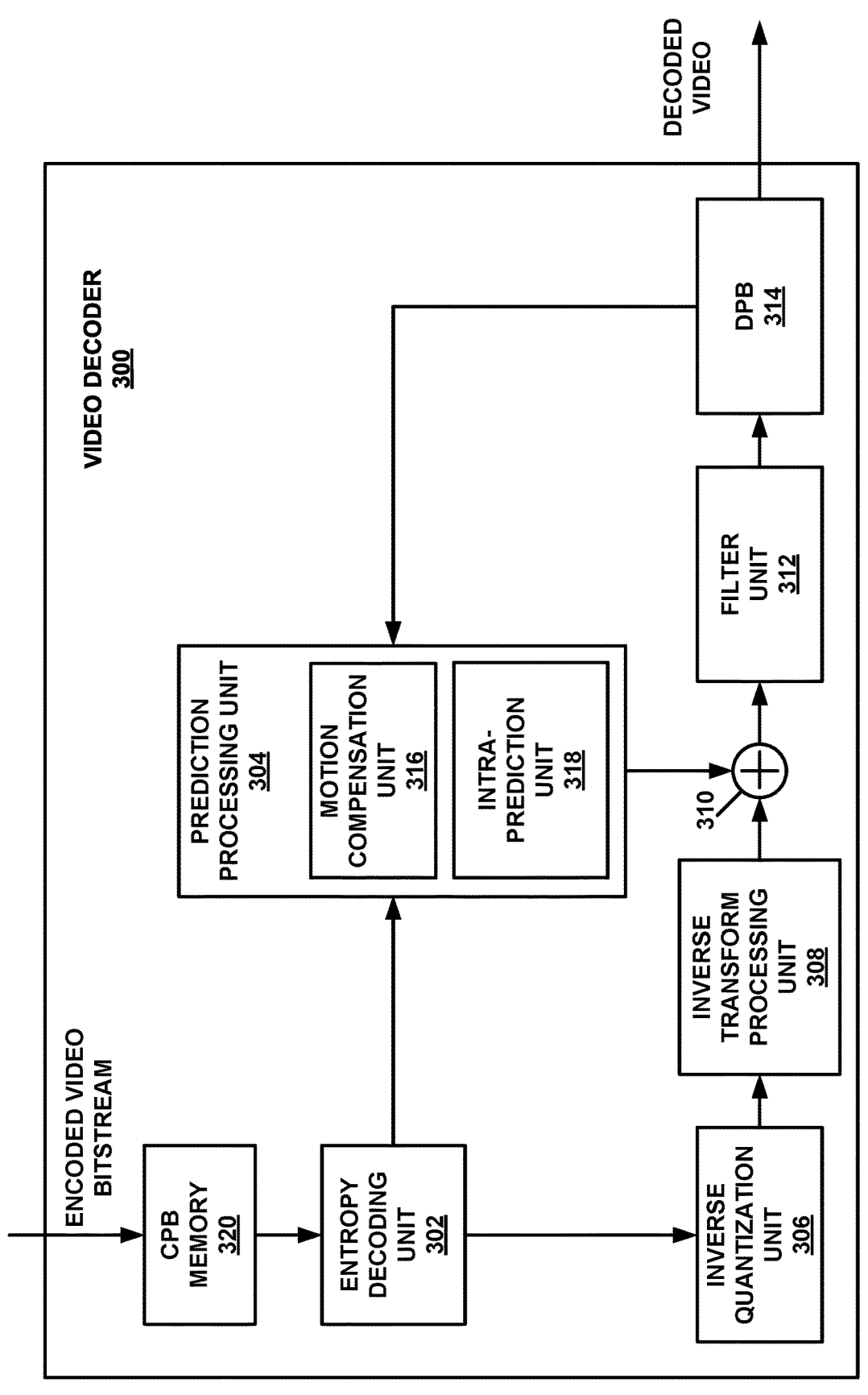
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

In accordance with the techniques of this disclosure, as was explained above, motion compensation unit 316 may be configured to determine an affine motion model using regression-based techniques. In one example, video decoder 300 may be configured to partition a coding block into subblocks. Motion compensation unit 316 may generate initial subblock motion vectors for a plurality of the subblocks, and refine the initial subblock motion vectors for the plurality of the subblocks using decoder side motion vector refinement to produce refined subblock motion vectors for the plurality of the subblocks. Motion compensation unit 316 may perform a linear regression on the refined subblock motion vectors and coordinates of the plurality of the subblocks to derive an affine motion model. Motion compensation unit 316 may then decode the coding block using the affine motion model. For example, motion compensation unit 316 may determine control point motion vectors from the derived affine motion model and decode the coding block using the determined control point motion vectors.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to partition a coding block into subblocks, generate initial subblock motion vectors for a plurality of the subblocks, refine the initial subblock motion vectors for the plurality of the subblocks using decoder side motion vector refinement to produce refined subblock motion vectors for the plurality of the subblocks, and perform a linear regression on the refined subblock motion vectors and coordinates of the plurality of the subblocks to derive an affine motion model.

Figure 7:
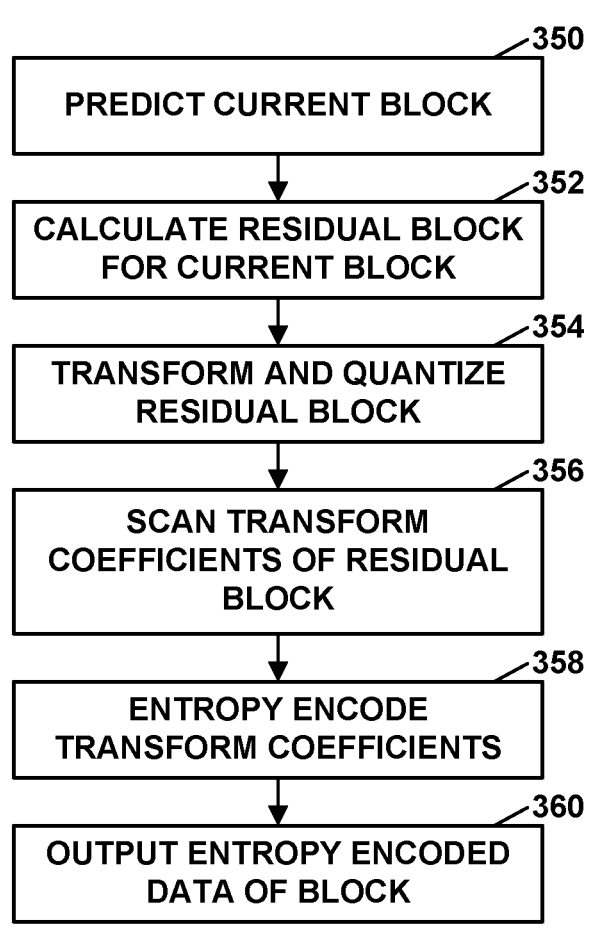
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may be or include a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

FIG. 8 is a flowchart illustrating an example method for decoding a current block of video data in accordance with the techniques of this disclosure. The current block may be or include a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

FIG. 9 is a flowchart illustrating another example method for encoding a current block in accordance with the techniques of this disclosure. The techniques of FIG. 9 may be performed during processes 350 and 352 of FIG. 7. Video encoder 200, including motion estimation unit 22 and motion compensation unit 224, may be configured to perform the techniques of FIG. 9.

Video encoder 200 may be configured to partition a coding block into subblocks (900), and generate initial subblock motion vectors for a plurality of the subblocks (902). In one example, video encoder 200 may generate the initial subblock motion vectors based on control point motion vectors representing an input affine motion model. Video encoder 200 may determine the control point motion vectors from an affine candidate merge list. In other examples, video encoder 200 may generate the initial subblock motion vectors based on a bi-predicted motion vector.

Video encoder 200 may further be configured to refine the initial subblock motion vectors for the plurality of the subblocks using decoder side motion vector refinement to produce refined subblock motion vectors for the plurality of the subblocks (904). For example, video encoder 200 may refine each of the initial subblock motion vectors independently using decoder side motion vector refinement to produce the refined subblock motion vectors for the plurality of the subblocks.

Video encoder 200 may then perform a linear regression on the refined subblock motion vectors and coordinates of the plurality of the subblocks to derive an affine motion model (906). Video encoder 200 may then encode the coding block using the affine motion model (908). For example, video encoder 200 may derive refined control point motion vectors for the coding block based on the affine motion model, and encode the coding block using the refined control point motion vectors.

In other examples, video encoder 200 may be further configured to derive a motion vector offset using the initial subblock motion vectors and decoder side motion vector refinement, wherein the decoder side motion vector refinement includes determining a first cost for the motion vector offset. Video encoder 200 may further be configured to determine a second cost for the affine motion model. Video encoder 200 may determine to use the motion vector offset or the affine motion model based on the first cost and the second cost.

Video encoder 200 may then encode the coding block using the affine motion model based on the first cost being greater than the second cost. Video encoder 200 may encode the coding block using the motion vector offset in based on the first cost being less than the second cost. Using the motion vector offset may include adding the motion vector offset to control point motion vectors associated with an initial affine motion model to generate refined control point motion vectors, and encoding the coding block using the refined control point motion vectors.

FIG. 10 is a flowchart illustrating another example method for decoding a current block in accordance with the techniques of this disclosure. The techniques of FIG. 10 may be performed during processes 374 and 380 of FIG. 8. Video decoder 300, including motion compensation unit 316, may be configured to perform the techniques of FIG. 10.

Video decoder 300 may be configured to partition a coding block into subblocks (950), and generate initial subblock motion vectors for a plurality of the subblocks (952). In one example, video decoder 300 may generate the initial subblock motion vectors based on control point motion vectors representing an input affine motion model. Video decoder 300 may determine the control point motion vectors from an affine candidate merge list. In other examples, video decoder 300 may generate the initial sub-block motion vectors based on a bi-predicted motion vector.

Video decoder 300 may further be configured to refine the initial subblock motion vectors for the plurality of the subblocks using decoder side motion vector refinement to produce refined subblock motion vectors for the plurality of the subblocks (954). For example, video decoder 300 may refine each of the initial subblock motion vectors independently using decoder side motion vector refinement to produce the refined subblock motion vectors for the plurality of the subblocks.

Video decoder 300 may then perform a linear regression on the refined subblock motion vectors and coordinates of the plurality of the subblocks to derive an affine motion model (956). Video decoder 300 may then decode the coding block using the affine motion model (958). For example, video decoder 300 may derive refined control point motion vectors for the coding block based on the affine motion model, and decode the coding block using the refined control point motion vectors.

In other examples, video decoder 300 may be further configured to derive a motion vector offset using the initial subblock motion vectors and decoder side motion vector refinement, wherein the decoder side motion vector refinement includes determining a first cost for the motion vector offset. Video decoder 300 may further be configured to determine a second cost for the affine motion model. Video decoder 300 may determine to use the motion vector offset or the affine motion model based on the first cost and the second cost.

Video decoder 300 may then decode the coding block using the affine motion model based on the first cost being greater than the second cost. Video decoder 300 may decode the coding block using the motion vector offset in based on the first cost being less than the second cost. Using the motion vector offset may include adding the motion vector offset to control point motion vectors associated with an initial affine motion model to generate refined control point motion vectors, and decoding the coding block using the refined control point motion vectors.

The following numbered clauses illustrate one or more aspects of the devices and techniques described in this disclosure.

Aspect 1A—A method of coding video data, the method comprising: partitioning a coding block into subblocks; generating initial subblock motion vectors for a plurality of the subblocks; refining the initial subblock motion vectors for the plurality of the subblocks using bilateral matching to produce refined subblock motion vectors for the plurality of the subblocks; performing a linear regression on the refined subblock motion vectors and the coordinates of the plurality of the subblocks to derive an affine motion model; and coding the coding block using the affine motion model.

Aspect 2A—The method of Aspect 1A, wherein the plurality of the subblocks is all of the subblocks of the coding block.

Aspect 3A—The method of Aspect 1A, wherein the plurality of the subblocks is a subset of the subblocks of the coding block.

Aspect 4A—The method of Aspect 1A, further comprising: deriving control point motion vectors for the coding block based on the affine motion model.

Aspect 5A—A method of coding video data, the method comprising: partitioning a coding block into subblocks; generating initial subblock motion vectors for a plurality of the subblocks; refining the initial subblock motion vectors for the plurality of the subblocks using bilateral matching to produce refined subblock motion vectors for the plurality of the subblocks; determining an affine motion model based on the refined subblock motion vectors; and coding the coding block using the affine motion model.

Aspect 6A—The method of Aspect 5A, wherein the plurality of the subblocks is all of the subblocks of the coding block.

Aspect 7A—The method of Aspect 5A, wherein the plurality of the subblocks is a subset of the subblocks of the coding block.

Aspect 8A—The method of Aspect 5A, wherein determining the affine motion model based on the refined subblock motion vectors comprises: determining control point motion vectors for the coding block based on the refined subblock motion vectors.

Aspect 9A—The method of any of Aspects 1A-8A, wherein coding comprises decoding.

Aspect 10A—The method of any of Aspects 1A-8A, wherein coding comprises encoding.

Aspect 11A—A device for coding video data, the device comprising one or more means for performing the method of any of Aspects 1A-10A.

Aspect 12A—The device of Aspect 11A, wherein the one or more means comprise one or more processors implemented in circuitry.

Aspect 13A—The device of any of Aspects 11A and 12A, further comprising a memory to store the video data.

Aspect 14A—The device of any of Aspects 11A-13A, further comprising a display configured to display decoded video data.

Aspect 15A—The device of any of Aspects 11A-14A, wherein the device comprises one or more of a camera, a computer, a mobile device, a broadcast receiver device, or a set-top box.

Aspect 16A—The device of any of Aspects 11A-15A, wherein the device comprises a video decoder.

Aspect 17A—The device of any of Aspects 11A-16A, wherein the device comprises a video encoder.

Aspect 18A—A computer-readable storage medium having stored thereon instructions that, when executed, cause one or more processors to perform the method of any of Aspects 1A-10A.

Aspect 19A—A device for encoding video data, the device comprising: means for partitioning a coding block into subblocks; means for generating initial subblock motion vectors for a plurality of the subblocks; means for refining the initial subblock motion vectors for the plurality of the subblocks using bilateral matching to produce refined subblock motion vectors for the plurality of the subblocks; means for performing a linear regression on the refined subblock motion vectors and the coordinates of the plurality of the subblocks to derive an affine motion model; and means for coding the coding block using the affine motion model.

Aspect 20A—A device for encoding video data, the device comprising: means for partitioning a coding block into subblocks; means for generating initial subblock motion vectors for a plurality of the subblocks; means for refining the initial subblock motion vectors for the plurality of the subblocks using bilateral matching to produce refined subblock motion vectors for the plurality of the subblocks; means for determining an affine motion model based on the refined subblock motion vectors; and means for coding the coding block using the affine motion model.

Aspect 1B—A method of decoding video data, the method comprising: partitioning a coding block into subblocks; generating initial subblock motion vectors for a plurality of the subblocks; refining the initial subblock motion vectors for the plurality of the subblocks using decoder side motion vector refinement to produce refined subblock motion vectors for the plurality of the subblocks; and performing a linear regression on the refined subblock motion vectors and coordinates of the plurality of the subblocks to derive an affine motion model.

Aspect 2B—The method of Aspect 1B, wherein generating the initial subblock motion vectors comprises: generating the initial subblock motion vectors based on control point motion vectors representing an input affine motion model.

Aspect 3B—The method of Aspect 2B, further comprising: determining the control point motion vectors from an affine candidate merge list.

Aspect 4B—The method of Aspect 1B, wherein generating the initial subblock motion vectors comprises: generating the initial subblock motion vectors based on a bi-predicted motion vector.

Aspect 5B—The method of any of Aspects 1B-4B, further comprising: decoding the coding block using the affine motion model.

Aspect 6B—The method of Aspect 5B, wherein decoding the coding block using the affine motion model comprises: deriving refined control point motion vectors for the coding block based on the affine motion model; and decoding the coding block using the refined control point motion vectors.

Aspect 7B—The method of any of Aspects 1B-6B, wherein refining the initial subblock motion vectors for the plurality of the subblocks using decoder side motion vector refinement to produce refined subblock motion vectors for the plurality of the subblocks comprises: refining each of the initial subblock motion vectors independently using decoder side motion vector refinement to produce the refined subblock motion vectors for the plurality of the subblocks.

Aspect 8B—The method of any of Aspects 1B-7B, further comprising: deriving a motion vector offset using the initial subblock motion vectors and decoder side motion vector refinement, wherein the decoder side motion vector refinement includes determining a first cost for the motion vector offset; determining a second cost for the affine motion model; and determining to use the motion vector offset or the affine motion model based on the first cost and the second cost.

Aspect 9B—The method of Aspect 8B, further comprising: decoding the coding block using the affine motion model based on the first cost being greater than the second cost.

Aspect 10B—The method of Aspect 8B, further comprising: decoding the coding block using the motion vector offset in based on the first cost being less than the second cost.

Aspect 11B—The method of Aspect 10B, wherein decoding the coding block using the motion vector offset comprises: adding the motion vector offset to control point motion vectors associated with an initial affine motion model to generate refined control point motion vectors; and decoding the coding block using the refined control point motion vectors.

Aspect 12B—The method of any of Aspects 1B-11B, wherein the plurality of the subblocks is all of the subblocks of the coding block.

Aspect 13B—The method of any of Aspects 1B-11B, wherein the plurality of the subblocks is a subset of the subblocks of the coding block.

Aspect 14B—An apparatus configured to decode video data, the apparatus comprising: a memory; and one or more processors in communication with the memory, the one or more processors configured to: partition a coding block into subblocks; generate initial subblock motion vectors for a plurality of the subblocks; refine the initial subblock motion vectors for the plurality of the subblocks using decoder side motion vector refinement to produce refined subblock motion vectors for the plurality of the subblocks; and perform a linear regression on the refined subblock motion vectors and coordinates of the plurality of the subblocks to derive an affine motion model.

Aspect 15B—The apparatus of Aspect 14B, wherein to generate the initial subblock motion vectors, the one or more processors are further configured to: generate the initial subblock motion vectors based on control point motion vectors representing an input affine motion model.

Aspect 16B—The apparatus of Aspect 15B, where the one or more processors are further configured to: determine the control point motion vectors from an affine candidate merge list.

Aspect 17B—The apparatus of Aspect 14B, wherein to generate the initial subblock motion vectors, the one or more processors are further configured to: generate the initial subblock motion vectors based on a bi-predicted motion vector.

Aspect 18B—The apparatus of any of Aspects 14B-17B, wherein the one or more processors are further configured to: decode the coding block using the affine motion model.

Aspect 19B—The apparatus of Aspect 18B, wherein to decode the coding block using the affine motion model, the one or more processors are further configured to: derive refined control point motion vectors for the coding block based on the affine motion model; and decode the coding block using the refined control point motion vectors.

Aspect 20B—The apparatus of any of Aspects 14B-19B, wherein to refine the initial subblock motion vectors for the plurality of the subblocks using decoder side motion vector refinement to produce refined subblock motion vectors for the plurality of the subblocks, the one or more processors are further configured to: refine each of the initial subblock motion vectors independently using decoder side motion vector refinement to produce the refined subblock motion vectors for the plurality of the subblocks.

Aspect 21B—The apparatus of any of Aspects 14B-20B, wherein the one or more processors are further configured to: derive a motion vector offset using the initial subblock motion vectors and decoder side motion vector refinement, wherein the decoder side motion vector refinement includes determining a first cost for the motion vector offset; determine a second cost for the affine motion model; and determine to use the motion vector offset or the affine motion model based on the first cost and the second cost.

Aspect 22B—The apparatus of Aspect 21B, wherein the one or more processors are further configured to: decode the coding block using the affine motion model based on the first cost being greater than the second cost.

Aspect 23B. The apparatus of Aspect 21B, wherein the one or more processors are further configured to: decode the coding block using the motion vector offset in based on the first cost being less than the second cost.

Aspect 24B—The apparatus of Aspect 23B, wherein to decode the coding block using the motion vector offset, the one or more processors are further configured to: add the motion vector offset to control point motion vectors associated with an initial affine motion model to generate refined control point motion vectors; and decode the coding block using the refined control point motion vectors.

Aspect 25B—The apparatus of any of Aspects 14B-24B, wherein the plurality of the subblocks is all of the subblocks of the coding block.

Aspect 26B—The apparatus of any of Aspects 14B-24B, wherein the plurality of the subblocks is a subset of the subblocks of the coding block.

Aspect 27B—An apparatus configured to decode video data, the apparatus comprising: means for partitioning a coding block into subblocks; means for generating initial subblock motion vectors for a plurality of the subblocks; means for refining the initial subblock motion vectors for the plurality of the subblocks using decoder side motion vector refinement to produce refined subblock motion vectors for the plurality of the subblocks; and means for performing a linear regression on the refined subblock motion vectors and coordinates of the plurality of the subblocks to derive an affine motion model.

Aspect 28B—The apparatus of Aspect 27B, further comprising: means for deriving a motion vector offset using the initial subblock motion vectors and decoder side motion vector refinement, wherein the decoder side motion vector refinement includes determining a first cost for the motion vector offset; means for determining a second cost for the affine motion model; and means for determining to use the motion vector offset or the affine motion model based on the first cost and the second cost.

Aspect 29B—A non-transitory computer-readable storage medium storing instructions that, when executed, cause one or more processors to: partition a coding block into subblocks; generate initial subblock motion vectors for a plurality of the subblocks; refine the initial subblock motion vectors for the plurality of the subblocks using decoder side motion vector refinement to produce refined subblock motion vectors for the plurality of the subblocks; and perform a linear regression on the refined subblock motion vectors and coordinates of the plurality of the subblocks to derive an affine motion model.

Aspect 30B—The non-transitory computer-readable storage medium of Aspect 29B, wherein the instructions further cause the one or more processors to: derive a motion vector offset using the initial subblock motion vectors and decoder side motion vector refinement, wherein the decoder side motion vector refinement includes determining a first cost for the motion vector offset; determine a second cost for the affine motion model; and determine to use the motion vector offset or the affine motion model based on the first cost and the second cost.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    partitioning a coding block into subblocks;
    generating initial subblock motion vectors for a plurality of the subblocks from a first affine motion model, wherein the first affine motion model has an associated first set of control point motion vectors;

refining the initial subblock motion vectors for the plurality of the subblocks using decoder side motion vector refinement to produce refined subblock motion vectors for the plurality of the subblocks;

performing a linear regression on the refined subblock motion vectors and coordinates of the plurality of the subblocks to derive a second affine motion model, wherein the second affine motion model has an associated second set of control point motion vectors; and in response to the second set of control point motion vectors producing a lower bilateral matching cost than the first set of control point motion vectors, decoding the block using the second affine motion model.

2. The method of claim 1, wherein generating the initial subblock motion vectors comprises:

generating the initial subblock motion vectors based on the first set of control point motion vectors representing the first affine motion model.

3. The method of claim 2, further comprising:

determining the first set of control point motion vectors from an affine candidate merge list.

4. The method of claim 1, wherein generating the initial subblock motion vectors comprises:

generating the initial subblock motion vectors based on a bi-predicted motion vector.

5. The method of claim 1, wherein decoding the block using the second affine motion model comprises:

deriving the second set of control point motion vectors for the coding block based on the second affine motion model; and decoding the coding block using the the second set of control point motion vectors.

6. The method of claim 1, wherein refining the initial subblock motion vectors for the plurality of the subblocks using decoder side motion vector refinement to produce refined subblock motion vectors for the plurality of the subblocks comprises:

refining each of the initial subblock motion vectors independently using decoder side motion vector refinement to produce the refined subblock motion vectors for the plurality of the subblocks.

7. The method of claim 1, further comprising:

deriving a motion vector offset using the initial subblock motion vectors and decoder side motion vector refinement, wherein the decoder side motion vector refinement includes determining a first cost for the motion vector offset;

determining a second cost for the second affine motion model; and determining to use the motion vector offset or the second affine motion model based on the first cost and the second cost.

8. The method of claim 7, further comprising:

decoding the coding block using the second affine motion model based on the first cost being greater than the second cost.

9. The method of claim 7, further comprising:

decoding the coding block using the motion vector offset in based on the first cost being less than the second cost.

10. The method of claim 9, wherein decoding the coding block using the motion vector offset comprises:

adding the motion vector offset to the first set of control point motion vectors associated with the first affine motion model to generate refined control point motion vectors; and decoding the coding block using the refined control point motion vectors.

11. The method of claim 1, wherein the plurality of the subblocks is all of the subblocks of the coding block.

12. The method of claim 1, wherein the plurality of the subblocks is a subset of the subblocks of the coding block.

13. An apparatus configured to decode video data, the apparatus comprising:

a memory; and one or more processors in communication with the memory, the one or more processors configured to:

partition a coding block into subblocks;

generate initial subblock motion vectors for a plurality of the subblocks from a first affine motion model, wherein the first affine motion model has an associated first set of control point motion vectors;

refine the initial subblock motion vectors for the plurality of the subblocks using decoder side motion vector refinement to produce refined subblock motion vectors for the plurality of the subblocks;

perform a linear regression on the refined subblock motion vectors and coordinates of the plurality of the subblocks to derive a second affine motion model, wherein the second affine motion model has an associated second set of control point motion vectors; and in response to the second set of control point motion vectors producing a lower bilateral matching cost than the first set of control point motion vectors, decode the block using the second affine motion model.

14. The apparatus of claim 13, wherein to generate the initial subblock motion vectors, the one or more processors are further configured to:

generate the initial subblock motion vectors based on the first set of control point motion vectors representing the first affine motion model.

15. The apparatus of claim 14, where the one or more processors are further configured to:

determine the first set of control point motion vectors from an affine candidate merge list.

16. The apparatus of claim 13, wherein to generate the initial subblock motion vectors, the one or more processors are further configured to:

generate the initial subblock motion vectors based on a bi-predicted motion vector.

17. The apparatus of claim 13, wherein to decode the coding block using the affine motion model, the one or more processors are further configured to:

derive the second set of control point motion vectors for the coding block based on the second affine motion model; and decode the coding block using the second set of control point motion vectors.

18. The apparatus of claim 13, wherein to refine the initial subblock motion vectors for the plurality of the subblocks using decoder side motion vector refinement to produce refined subblock motion vectors for the plurality of the subblocks, the one or more processors are further configured to:

refine each of the initial subblock motion vectors independently using decoder side motion vector refinement to produce the refined subblock motion vectors for the plurality of the subblocks.

19. The apparatus of claim 13, wherein the one or more processors are further configured to:

derive a motion vector offset using the initial subblock motion vectors and decoder side motion vector refinement, wherein the decoder side motion vector refinement includes determining a first cost for the motion vector offset;

determine a second cost for the second affine motion model; and determine to use the motion vector offset or the second affine motion model based on the first cost and the second cost.

20. The apparatus of claim 19, wherein the one or more processors are further configured to:

decode the coding block using the second affine motion model based on the first cost being greater than the second cost.

21. The apparatus of claim 19, wherein the one or more processors are further configured to:

decode the coding block using the motion vector offset in based on the first cost being less than the second cost.

22. The apparatus of claim 21, wherein to decode the coding block using the motion vector offset, the one or more processors are further configured to:

add the motion vector offset to the first set of control point motion vectors associated with the first affine motion model to generate refined control point motion vectors; and decode the coding block using the refined control point motion vectors.

23. The apparatus of claim 13, wherein the plurality of the subblocks is all of the subblocks of the coding block.

24. The apparatus of claim 13, wherein the plurality of the subblocks is a subset of the subblocks of the coding block.

25. A method of encoding video data, the method comprising:

partitioning a coding block into subblocks;

generating initial subblock motion vectors for a plurality of the subblocks from a first affine motion model, wherein the first affine motion model has an associated first set of control point motion vectors;

refining the initial subblock motion vectors for the plurality of the subblocks using decoder side motion vector refinement to produce refined subblock motion vectors for the plurality of the subblocks;

performing a linear regression on the refined subblock motion vectors and coordinates of the plurality of the subblocks to derive a second affine motion model, wherein the second affine motion model has an associated second set of control point motion vectors; and in response to the second set of control point motion vectors producing a lower bilateral matching cost than the first set of control point motion vectors, encoding the coding block using the affine motion model.

26. An apparatus configured to encode video data, the apparatus comprising:

a memory; and one or more processors in communication with the memory, the one or more processors configured to:

partition a coding block into subblocks;

generate initial subblock motion vectors for a plurality of the subblocks from a first affine motion model, wherein the first affine motion model has an associated first set of control point motion vectors;

refine the initial subblock motion vectors for the plurality of the subblocks using decoder side motion vector refinement to produce refined subblock motion vectors for the plurality of the subblocks;

perform a linear regression on the refined subblock motion vectors and coordinates of the plurality of the subblocks to derive a second affine motion model, wherein the second affine motion model has an associated second set of control point motion vectors; and in response to the second set of control point motion vectors producing a lower bilateral matching cost than the first set of control point motion vectors, encode the coding block using the affine motion model.

* * * * *